(12) United States Patent
Park et al.

(10) Patent No.: US 12,231,644 B2
(45) Date of Patent: Feb. 18, 2025

(54) IMAGE ENCODING/DECODING METHOD AND DEVICE FOR PERFORMING BDOF, AND METHOD FOR TRANSMITTING BITSTREAM

(71) Applicant: LG Electronics Inc., Seoul (KR)

(72) Inventors: Nae Ri Park, Seoul (KR); Jung Hak Nam, Seoul (KR); Hyeong Moon Jang, Seoul (KR); Seung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 17/639,837

(22) PCT Filed: Sep. 9, 2020

(86) PCT No.: PCT/KR2020/012153
§ 371 (c)(1),
(2) Date: Mar. 2, 2022

(87) PCT Pub. No.: WO2021/049865
PCT Pub. Date: Mar. 18, 2021

(65) Prior Publication Data
US 2022/0337842 A1    Oct. 20, 2022

Related U.S. Application Data

(60) Provisional application No. 62/898,531, filed on Sep. 10, 2019, provisional application No. 62/904,648, filed on Sep. 23, 2019.

(51) Int. Cl.
*H04N 19/82* (2014.01)
*H04N 19/132* (2014.01)
(Continued)

(52) U.S. Cl.
CPC ......... *H04N 19/132* (2014.11); *H04N 19/137* (2014.11); *H04N 19/159* (2014.11); *H04N 19/176* (2014.11)

(58) Field of Classification Search
CPC .. H04N 19/132; H04N 19/137; H04N 19/159; H04N 19/176; H04N 19/82
See application file for complete search history.

(56) References Cited

U.S. PATENT DOCUMENTS

2017/0094305 A1\* 3/2017 Li ........................ H04N 19/136
2019/0068991 A1   2/2019 Xu et al.
(Continued)

FOREIGN PATENT DOCUMENTS

CN    104137549 A    11/2014
CN    110115032 A    8/2019
(Continued)

OTHER PUBLICATIONS

Bross et al. Versatile Video Coding (Draft 6). Joint Video Experts Team (JVET) of ITU-T SG 16 WP 3 and ISO/IEC JTC 1/SC 29/ WG 11. JVET-O2001-vE. 15th Meeting: Gothenburg, SE. pp. 1-439, Jul. 31, 2019. Retrieved from <http://phenix.int-evry.fr/jvet/> (Year: 2019).\*

(Continued)

*Primary Examiner* — Patrick E Demosky
(74) *Attorney, Agent, or Firm* — Fish & Richardson P.C.

(57) ABSTRACT

An image encoding/decoding method and apparatus are provided. An image decoding method according to the present disclosure is performed by an image decoding apparatus. The image decoding method may comprise deriving a prediction sample of a current block based on motion information of the current block, determining whether bi-directional optical flow (BDOF) applies to the current block, based on that the BDOF applies to the current block, (Continued)

deriving a gradient for a current subblock in the current block, deriving motion refinement ($v_x$, $v_y$) for the current subblock based on the gradient, deriving a BDOF offset based on the gradient and the motion refinement, and deriving a refined prediction sample for the current block based on the prediction sample of the current block and the BDOF offset.

11 Claims, 19 Drawing Sheets

(51) Int. Cl.
*H04N 19/137* (2014.01)
*H04N 19/159* (2014.01)
*H04N 19/176* (2014.01)

(56) References Cited

U.S. PATENT DOCUMENTS

| | | |
|---|---|---|
| 2019/0089974 A1 | 3/2019 | Lee |
| 2019/0110061 A1 | 4/2019 | Park et al. |
| 2019/0141333 A1 | 5/2019 | Lee |
| 2019/0158843 A1 | 5/2019 | Xu et al. |
| 2021/0127133 A1* | 4/2021 | Chen .................. H04N 19/577 |

FOREIGN PATENT DOCUMENTS

| | | |
|---|---|---|
| KR | 20180129860 | 12/2018 |
| KR | 20190024553 | 3/2019 |
| WO | WO 2019045427 | 3/2019 |

OTHER PUBLICATIONS

Bross et al., "Versatile Video Coding (Draft 6)," JVET-O2001-vE, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pages.

Chujoh et al., "Non-CE9: A bug fix of BDOF specification," JVET-O0207-v2, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 5 pages.

Japanese Office Action in Japanese Application No. 2022-515879, dated Mar. 7, 2023, 11 pages (with English translation).

Office Action in Korean Appln. No. 10-2022-7005733, mailed on Feb. 1, 2024, 19 pages (with Machine translation).

Xiu et al., "CE9-related: Improvements on bi-directional optical flow (BDOF)," JVET-N0325, Joint Video Experts Team (JVET) of ITU-T SG 16 WP 3 and ISO/IEC JTC 1/SC 29/WG 11, 14th Meeting: Geneva, CH, Mar. 19-27, 2019, 7 pages.

Office Action in Chinese Appln. No. 202080063601.0, mailed on Jul. 30, 2024, 19 pages (with English translation).

* cited by examiner

FIG. 15

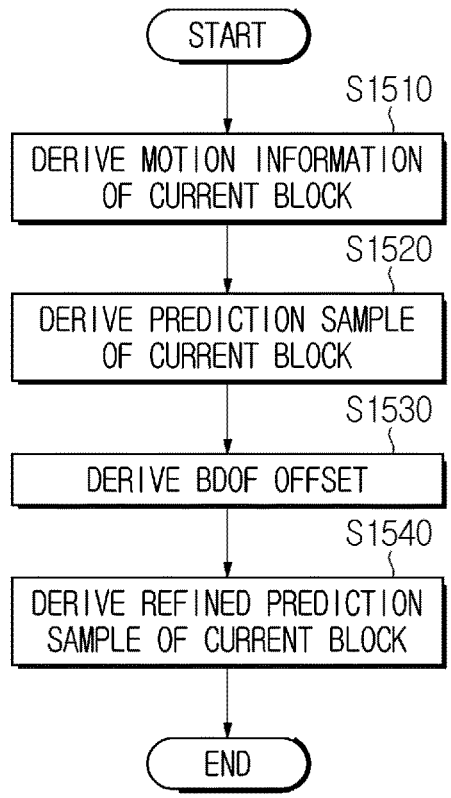

FIG. 16

Bi-directional optical flow prediction process

Inputs to this process are:

- two variables nCbW and nCbH specifying the width and the height of the current coding block,
- two (nCbW + 2)x(nCbH + 2) luma prediction sample arrays predSamplesL0 and predSamplesL1,
- the prediction list utilization flags predFlagL0 and predFlagL1,
- the reference indices refIdxL0 and refIdxL1,
- the bi-directional optical flow utilization flags bdofUtilizationFlag[ xIdx ][ yIdx ] with xIdx = 0..( nCbW >> 2 ) − 1, yIdx = 0..( nCbH >> 2 ) − 1.

Output of this process is the (nCbW)x(nCbH) array pbSamples of luma prediction sample values.

FIG. 17

Variables bitDepth, shift1, shift2, shift3, shift4, offset4, and mvRefineThres are derived as follows:
- The variable bitDepth is set equal to BitDepth$_Y$.
- The variable shift1 is set to equal to Max( 6, bitDepth − 6 ).
- The variable shift2 is set to equal to Max( 4, bitDepth − 8 ).
- The variable shift3 is set to equal to Max( 1, bitDepth − 11 ).
- The variable shift4 is set equal to Max( 3, 15 − bitDepth ) and the variable offset4 is set equal to 1 << ( shift4 − 1 ).
- The variable mvRefineThres is set equal to 1 << Max( 5, bitDepth − 7 ).

FIG. 18

For xIdx = 0..( nCbW >> 2 ) − 1 and yIdx = 0..( nCbH >> 2 ) − 1, the following applies:
- The variable xSb is set equal to ( xIdx << 2) + 1 and ySb is set equal to ( yIdx << 2 ) + 1.
- If bdofUtilizationFlag[ xIdx ][ yIdx ] is equal to FALSE, for x = xSb − 1..xSb + 2, y = ySb − 1.. ySb + 2, the prediction sample values of the current subblock are derived as follows:

$$pbSamples[\,x\,][\,y\,] = Clip3(\,0,\,(\,2^{bitDepth}\,) - 1, \\ (\,predSamplesL0[\,x + 1\,][\,y + 1\,] + offset4 + \\ predSamplesL1[\,x + 1\,][\,y + 1\,]\,) >> shift4\,) \quad (1)$$

- Otherwise (bdofUtilizationFlag[ xIdx ][ yIdx ] is equal to TRUE), the prediction sample values of the current subblock are derived by performing BDOF process

FIG. 19

For x =xSb − 1..xSb + 4, y = ySb − 1..ySb + 4, the following ordered steps apply:
    1. The locations ( $h_x$, $v_y$ ) for each of the corresponding sample locations ( x, y ) inside the prediction sample arrays are derived as follows:

$$h_x = \text{Clip3}( 1, nCbW, x ) \quad (1)$$

$$v_y = \text{Clip3}( 1, nCbH, y ) \quad (2)$$

2. The variables gradientHL0[ x ][ y ], gradientVL0[ x ][ y ], gradientHL1[ x ][ y ] and gradientVL1[ x ][ y ] are derived as follows:

$$\text{gradientHL0}[ x ][ y ] = ( \text{predSamplesL0}[ h_x + 1 ][v_y] >> \text{shift1} ) - ( \text{predSampleL0}[ h_x - 1 ][ v_y ] ) >> \text{shift1} ) \quad (3)$$

$$\text{gradientVL0}[ x ][ y ] = ( \text{predSampleL0}[ h_x ][ v_y + 1 ] >> \text{shift1} ) - ( \text{predSampleL0}[ h_x ][v_y - 1 ] ) >> \text{shift1} ) \quad (4)$$

$$\text{gradientHL1}[ x ][ y ] = ( \text{predSamplesL1}[ h_x + 1 ][v_y] >> \text{shift1} ) - ( \text{predSampleL1}[ h_x - 1 ][ v_y ] ) >> \text{shift1} ) \quad (5)$$

$$\text{gradientVL1}[ x ][ y ] = ( \text{predSampleL1}[ h_x ][ v_y + 1 ] >> \text{shift1} ) - ( \text{predSampleL1}[ h_x ][v_y - 1 ] ) >> \text{shift1} ) \quad (6)$$

3. The variables diff[ x ][ y ], tempH[ x ][ y ] and tempV[ x ][ y ] are derived as follows:

$$\text{diff}[ x ][ y ] = (\text{predSamplesL0}[ h_x ][ v_y ] >> \text{shift2} ) - ( \text{predSamplesL1}[ h_x ][ v_y ] >> \text{shift2} ) \quad (7)$$

$$\text{tempH}[ x ][ y ] = (\text{gradientHL0}[ x ][ y ] + \text{gradientHL1}[ x ][ y ] ) >> \text{shift3} \quad (8)$$

$$\text{tempV}[ x ][ y ] = (\text{gradientVL0}[ x ][ y ] + \text{gradientVL1}[ x ][ y ] ) >> \text{shift3} \quad (9)$$

− The variables sGx2, sGy2, sGxGy, sGxdI and sGydI are derived as follows:

$$sGx2 = \Sigma_i \Sigma_j \text{Abs}( \text{tempH}[ xSb + i ][ ySb + j ] ) \text{ with } i, j = -1..4 \quad (10)$$

$$sGy2 = \Sigma_i \Sigma_j \text{Abs}( \text{tempV}[ xSb + i ][ ySb + j ] ) \text{ with } i, j = -1..4 \quad (11)$$

$$sGxGy = \Sigma_i \Sigma_j ( \text{Sign}( \text{tempV}[ xSb + i ][ ySb + j ] ) * \text{tempH}[ xSb + i ][ ySb + j ] ) \text{ with } i, j = -1..4 \quad (12)$$

$$sGxGy_m = sGxGy >> 12 \quad (13)$$

$$sGxGy_s = sGxGy \text{ \& } ( ( 1 << 12 ) - 1 ) \quad (14)$$

$$sGxdI = \Sigma_i \Sigma_j ( - \text{Sign}( \text{tempH}[ xSb + i ][ ySb + j ] ) * \text{diff}[ xSb + i ][ ySb + j ] ) \text{ with } i, j = -1..4 \quad (15)$$

$$sGydI = \Sigma_i \Sigma_j ( - \text{Sign}( \text{tempV}[ xSb + i ][ ySb + j ] ) * \text{diff}[ xSb + i ][ ySb + j ] ) \text{ with } i, j = -1..4 \quad (16)$$

FIG. 20

- The horizontal and vertical motion offset of the current subblock are derived as:

$$v_x = sGx2 > 0 \;?\; \text{Clip3}(-mvRefineThres, mvRefineThres, -(sGxdI << 3) >> \text{Floor}(\text{Log2}(sGx2))) : 0 \quad (1)$$

$$v_y = sGy2 > 0 \;?\; \text{Clip3}(-mvRefineThres, mvRefineThres, ((sGydI << 3) - ((v_x * sGxGy_m) << 12 + v_x * sGxGy_s) >> 1) >> \text{Floor}(\text{Log2}(sGy2))) : 0 \quad (2)$$

- For x =xSb − 1..xSb + 2, y = ySb − 1..ySb + 2, the prediction sample values of the current sub-block are derived as follows:

$$bdofOffset = (v_x * (gradientHL0[x+1][y+1] - gradientHL1[x+1][y+1])) >> 1 + (v_y * (gradientVL0[x+1][y+1] - gradientVL1[x+1][y+1])) >> 1 \quad (3)$$

$$pbSamples[x][y] = \text{Clip3}(0, (2^{bitDepth}) - 1, (predSamplesL0[x+1][y+1] + offset4 + predSamplesL1[x+1][y+1] + bdofOffset) >> shift4) \quad (4)$$

FIG. 21

Variables bitDepth, shift1, shift2, shift3, shift4, offset4, and mvRefineThres are derived as follows:

- The variable bitDepth is set equal to $BitDepth_Y$.
- The variable shift1 is set to equal to 7.
- The variable shift2 is set to equal to 4.
- The variable shift3 is set to equal to 1.
- The variable shift4 is set equal to Max( 3, 15 − bitDepth ) and the variable offset4 is set equal to 1 << ( shift4 − 1 ).
- The variable mvRefineThres is set equal to 1 << 5.

FIG. 22

For x = xSb − 1..xSb + 4, y = ySb − 1..ySb + 4, the following ordered steps apply:
  1. The locations ( $h_x$, $v_y$ ) for each of the corresponding sample locations ( x, y ) inside the prediction sample arrays are derived as follows:

$$h_x = \text{Clip3}(1, nCbW, x) \tag{1}$$

$$v_y = \text{Clip3}(1, nCbH, y) \tag{2}$$

2. The variables gradientHL0[ x ][ y ], gradientVL0[ x ][ y ], gradientHL1[ x ][ y ] and gradientVL1[ x ][ y ] are derived as follows:

$$\text{gradientHL0}[x][y] = (\text{predSamplesL0}[h_x + 1][v_y]) - (\text{predSampleL0}[h_x - 1][v_y])) \tag{3}$$

$$\text{gradientVL0}[x][y] = (\text{predSampleL0}[h_x][v_y + 1]) - (\text{predSampleL0}[h_x][v_y - 1])) \tag{4}$$

$$\text{gradientHL1}[x][y] = (\text{predSamplesL1}[h_x + 1][v_y]) - (\text{predSampleL1}[h_x - 1][v_y])) \tag{5}$$

$$\text{gradientVL1}[x][y] = (\text{predSampleL1}[h_x][v_y + 1]) - (\text{predSampleL1}[h_x][v_y - 1])) \tag{6}$$

3. The variables diff[ x ][ y ], tempH[ x ][ y ] and tempV[ x ][ y ] are derived as follows:

$$\text{diff}[x][y] = (\text{predSamplesL0}[h_x][v_y] \gg \text{shift2}) - (\text{predSamplesL1}[h_x][v_y] \gg \text{shift2}) \tag{7}$$

$$\text{tempH}[x][y] = (\text{gradientHL0}[x][y] + \text{gradientHL1}[x][y]) \gg \text{shift3} \tag{8}$$

$$\text{tempV}[x][y] = (\text{gradientVL0}[x][y] + \text{gradientVL1}[x][y]) \gg \text{shift3} \tag{9}$$

— The variables sGx2, sGy2, sGxGy, sGxdI and sGydI are derived as follows:

$$\text{sGx2} = \Sigma_i \Sigma_j \text{Abs}(\text{tempH}[xSb + i][ySb + j]) \text{ with } i, j = -1..4 \tag{10}$$

$$\text{sGy2} = \Sigma_i \Sigma_j \text{Abs}(\text{tempV}[xSb + i][ySb + j]) \text{ with } i, j = -1..4 \tag{11}$$

$$\text{sGxGy} = \Sigma_i \Sigma_j (\text{Sign}(\text{tempV}[xSb + i][ySb + j]) * \text{tempH}[xSb + i][ySb + j]) \text{ with } i, j = -1..4 \tag{12}$$

$$\text{sGxGy}_m = \text{sGxGy} \gg 12 \tag{13}$$

$$\text{sGxGy}_s = \text{sGxGy} \text{ \& } ((1 \ll 12) - 1) \tag{14}$$

$$\text{sGxdI} = \Sigma_i \Sigma_j (-\text{Sign}(\text{tempH}[xSb + i][ySb + j]) * \text{diff}[xSb + i][ySb + j]) \text{ with } i, j = -1..4 \tag{15}$$

$$\text{sGydI} = \Sigma_i \Sigma_j (-\text{Sign}(\text{tempV}[xSb + i][ySb + j]) * \text{diff}[xSb + i][ySb + j]) \text{ with } i, j = -1..4 \tag{16}$$

FIG. 23

- The horizontal and vertical motion offset of the current subblock are derived as:

$$v_x = sGx2 > 0 \;?\; \text{Clip3}(-mvRefineThres, mvRefineThres, -(sGxdI << 3) >> \text{Floor}(\text{Log2}(sGx2))) : 0 \quad (1)$$

$$v_y = sGy2 > 0 \;?\; \text{Clip3}(-mvRefineThres, mvRefineThres, ((sGydI << 3) - ((v_x * sGxGy_m) << 12 + v_x * sGxGy_s) >> 1) >> \text{Floor}(\text{Log2}(sGy2))) : 0 \quad (2)$$

- For x = xSb − 1..xSb + 2, y = ySb − 1..ySb + 2, the prediction sample values of the current sub-block are derived as follows:

$$bdofOffset = (v_x * (gradientHL0[x+1][y+1] - gradientHL1[x+1][y+1])) >> shift1 + (v_y * (gradientVL0[x+1][y+1] - gradientVL1[x+1][y+1])) >> shift1 \quad (3)$$

$$pbSamples[x][y] = \text{Clip3}(0, (2^{bitDepth}) - 1, (predSamplesL0[x+1][y+1] + offset4 + predSamplesL1[x+1][y+1] + bdofOffset) >> shift4) \quad (4)$$

FIG. 24

Variables bitDepth, shift1, shift2, shift3, shift4, offset4, and mvRefineThres are derived as follows:

- The variable bitDepth is set equal to $BitDepth_Y$.
- The variable shift1 is set to equal to 6.
- The variable shift2 is set to equal to 4.
- The variable shift3 is set to equal to 1.
- The variable shift4 is set equal to Max(3, 15 − bitDepth) and the variable offset4 is set equal to 1 << (shift4 − 1).
- The variable mvRefineThres is set equal to 1 << 5.

FIG. 25

For x = xSb − 1..xSb + 4, y = ySb − 1..ySb + 4, the following ordered steps apply:
1. The locations ( $h_x$, $v_y$ ) for each of the corresponding sample locations ( x, y ) inside the prediction sample arrays are derived as follows:

$$h_x = \text{Clip3}(1, nCbW, x) \qquad (1)$$

$$v_y = \text{Clip3}(1, nCbH, y) \qquad (2)$$

2. The variables gradientHL0[ x ][ y ], gradientVL0[ x ][ y ], gradientHL1[ x ][ y ] and gradientVL1[ x ][ y ] are derived as follows:

$$\text{gradientHL0}[x][y] = (\text{predSamplesL0}[h_x + 1][v_y] >> 1) - (\text{predSampleL0}[h_x - 1][v_y] >> 1)) \qquad (3)$$

$$\text{gradientVL0}[x][y] = (\text{predSampleL0}[h_x][v_y + 1] >> 1) - (\text{predSampleL0}[h_x][v_y - 1] >> 1)) \qquad (4)$$

$$\text{gradientHL1}[x][y] = (\text{predSamplesL1}[h_x + 1][v_y] >> 1) - (\text{predSampleL1}[h_x - 1][v_y] >> 1)) \qquad (5)$$

$$\text{gradientVL1}[x][y] = (\text{predSampleL1}[h_x][v_y + 1] >> 1) - (\text{predSampleL1}[h_x][v_y - 1] >> 1)) \qquad (6)$$

3. The variables diff[ x ][ y ], tempH[ x ][ y ] and tempV[ x ][ y ] are derived as follows:

$$\text{diff}[x][y] = (\text{predSamplesL0}[h_x][v_y] >> \text{shift2}) - (\text{predSamplesL1}[h_x][v_y] >> \text{shift2}) \qquad (7)$$

$$\text{tempH}[x][y] = (\text{gradientHL0}[x][y] + \text{gradientHL1}[x][y]) >> \text{shift3} \qquad (8)$$

$$\text{tempV}[x][y] = (\text{gradientVL0}[x][y] + \text{gradientVL1}[x][y]) >> \text{shift3} \qquad (9)$$

− The variables sGx2, sGy2, sGxGy, sGxdI and sGydI are derived as follows:

$$sGx2 = \Sigma_i \Sigma_j \text{Abs}(\text{tempH}[xSb + i][ySb + j]) \text{ with } i, j = -1..4 \qquad (10)$$

$$sGy2 = \Sigma_i \Sigma_j \text{Abs}(\text{tempV}[xSb + i][ySb + j]) \text{ with } i, j = -1..4 \qquad (11)$$

$$sGxGy = \Sigma_i \Sigma_j (\text{Sign}(\text{tempV}[xSb + i][ySb + j]) * \text{tempH}[xSb + i][ySb + j]) \text{ with } i, j = -1..4 \qquad (12)$$

$$sGxGy_m = sGxGy >> 12 \qquad (13)$$

$$sGxGy_s = sGxGy \,\&\, ((1 << 12) - 1) \qquad (14)$$

$$sGxdI = \Sigma_i \Sigma_j (-\text{Sign}(\text{tempH}[xSb + i][ySb + j]) * \text{diff}[xSb + i][ySb + j]) \text{ with } i, j = -1..4 \qquad (15)$$

$$sGydI = \Sigma_i \Sigma_j (-\text{Sign}(\text{tempV}[xSb + i][ySb + j]) * \text{diff}[xSb + i][ySb + j]) \text{ with } i, j = -1..4 \qquad (16)$$

FIG. 26

Variables bitDepth, shift1, shift2, shift3, shift4, offset4, and mvRefineThres are derived as follows:
- The variable bitDepth is set equal to BitDepth$_Y$.
- The variable shift1 is set to equal to 7.
- The variable shift2 is set to equal to 4.
- The variable shift3 is set to equal to 1.
- The variable shift4 is set equal to Max( 3, 15 − bitDepth ) and the variable offset4 is set equal to 1 << ( shift4 − 1 ).
- The variable mvRefineThres is set equal to 1 << 5.
- The variable gradLimit is set equal to 1 << Max( 15, BitDepth + 3 )

FIG. 27

For x = xSb − 1..xSb + 4, y = ySb − 1..ySb + 4, the following ordered steps apply:

1. The locations ($h_x$, $v_y$) for each of the corresponding sample locations (x, y) inside the prediction sample arrays are derived as follows:

$$h_x = Clip3(1, nCbW, x) \quad (1)$$

$$v_y = Clip3(1, nCbH, y) \quad (2)$$

2. The variables gradientHL0[ x ][ y ], gradientVL0[ x ][ y ], gradientHL1[ x ][ y ] and gradientVL1[ x ][ y ] are derived as follows:

$$gradientHL0[\,x\,][\,y\,] = Clip3(-gradLimit, gradLimit - 1, (predSamplesL0[\,h_x+1\,][v_y]) - (predSampleL0[\,h_x-1\,][\,v_y\,])) \quad (3)$$

$$gradientVL0[\,x\,][\,y\,] = Clip3(-gradLimit, gradLimit - 1, (predSampleL0[\,h_x\,][\,v_y+1\,]) - (predSampleL0[\,h_x\,][v_y-1\,])) \quad (4)$$

$$gradientHL1[\,x\,][\,y\,] = Clip3(-gradLimit, gradLimit - 1, (predSamplesL1[\,h_x+1\,][v_y]) - (predSampleL1[\,h_x-1\,][\,v_y\,])) \quad (5)$$

$$gradientVL1[\,x\,][\,y\,] = Clip3(-gradLimit, gradLimit - 1, (predSampleL1[\,h_x\,][\,v_y+1\,]) - (predSampleL1[\,h_x\,][v_y-1\,])) \quad (6)$$

3. The variables diff[ x ][ y ], tempH[ x ][ y ] and tempV[ x ][ y ] are derived as follows:

$$diff[\,x\,][\,y\,] = (predSamplesL0[\,h_x\,][\,v_y\,] >> shift2) - (predSamplesL1[\,h_x\,][\,v_y\,] >> shift2) \quad (7)$$

$$tempH[\,x\,][\,y\,] = (gradientHL0[\,x\,][\,y\,] + gradientHL1[\,x\,][\,y\,]) >> shift3 \quad (8)$$

$$tempV[\,x\,][\,y\,] = (gradientVL0[\,x\,][\,y\,] + gradientVL1[\,x\,][\,y\,]) >> shift3 \quad (9)$$

– The variables sGx2, sGy2, sGxGy, sGxdI and sGydI are derived as follows:

$$sGx2 = \Sigma_i\Sigma_j\,Abs(tempH[\,xSb+i\,][\,ySb+j\,])\text{ with } i, j = -1..4 \quad (10)$$

$$sGy2 = \Sigma_i\Sigma_j\,Abs(tempV[\,xSb+i\,][\,ySb+j\,])\text{ with } i, j = -1..4 \quad (11)$$

$$sGxGy = \Sigma_i\Sigma_j(Sign(tempV[\,xSb+i\,][\,ySb+j\,]) * tempH[\,xSb+i\,][\,ySb+j\,])\text{ with } i, j = -1..4 \quad (12)$$

$$sGxGy_m = sGxGy >> 12 \quad (13)$$

$$sGxGy_s = sGxGy\,\&\,((1 << 12) - 1) \quad (14)$$

$$sGxdI = \Sigma_i\Sigma_j(-Sign(tempH[\,xSb+i\,][\,ySb+j\,]) * diff[\,xSb+i\,][\,ySb+j\,])\text{ with } i, j = -1..4 \quad (15)$$

$$sGydI = \Sigma_i\Sigma_j(-Sign(tempV[\,xSb+i\,][\,ySb+j\,]) * diff[\,xSb+i\,][\,ySb+j\,])\text{ with } i, j = -1..4 \quad (16)$$

IMAGE ENCODING/DECODING METHOD AND DEVICE FOR PERFORMING BDOF, AND METHOD FOR TRANSMITTING BITSTREAM

CROSS-REFERENCE TO RELATED APPLICATIONS

This application is a National Stage application under 35 U.S.C. § 371 of International Application No. PCT/KR2020/012153, filed on Sep. 9, 2020, which claims the benefit of U.S. Provisional Application No. 62/898,531, filed on Sep. 10, 2019 and U.S. Provisional Application No. 62/904,648, filed on Sep. 23, 2019. The disclosures of the prior applications are incorporated by reference in their entirety.

TECHNICAL FIELD

The present disclosure relates to an image encoding/decoding method and apparatus and a method of transmitting a bitstream, and, more particularly, to an image encoding/decoding method and apparatus for performing bi-directional optical flow (BDOF), and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for deriving a BDOF offset.

Another object of the present disclosure is to provide an image encoding/decoding method and apparatus for performing BDOF.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may comprise deriving a prediction sample of a current block based on motion information of the current block, determining whether bi-directional optical flow (BDOF) applies to the current block, based on that the BDOF applies to the current block, deriving a gradient for a current subblock in the current block, deriving motion refinement ($v_x$, $v_y$) for the current subblock based on the gradient, deriving a BDOF offset based on the gradient and the motion refinement, and deriving a refined prediction sample for the current block based on the prediction sample of the current block and the BDOF offset.

In the image decoding method according to the present disclosure, the deriving the gradient may comprise right-shifting the prediction sample of the current block by a first shift, and the first shift may be set to a fixed value regardless of a bit depth of the current block.

In the image decoding method according to the present disclosure, the first shift may be 6.

In the image decoding method according to the present disclosure, the deriving the motion refinement ($v_x$, $v_y$) may comprise deriving a first intermediate parameter diff based on the prediction sample of the current block and deriving second intermediate parameters tempH and tempV based on the gradient.

In the image decoding method according to the present disclosure, the deriving the first intermediate parameter diff may comprise right-shifting the prediction sample of the current block by a second shift, and the second shift may be set to a fixed value regardless of a bit depth of the current block.

In the image decoding method according to the present disclosure, the second shift may be 4

In the image decoding method according to the present disclosure, the deriving the second intermediate parameters tempH and tempV may comprise right-shifting a value derived based on the gradient by a third shift, and the third shift may be set to a fixed value regardless of a bit depth of the current block.

In the image decoding method according to the present disclosure, the third shift may be 1.

In the image decoding method according to the present disclosure, the motion refinement ($v_x$, $v_y$) may be clipped in a predetermined range.

In the image decoding method according to the present disclosure, the predetermined range in which the motion refinement ($v_x$, $v_y$) is clipped may be set to a fixed range regardless of a bit depth of the current block.

In the image decoding method according to the present disclosure, the deriving the BDOF offset may comprise right-shifting, by a predetermined shift, a value derived based on the gradient and the motion refinement, and the predetermined shift may be set to a fixed range regardless of a bit depth of the current block.

In the image decoding method according to the present disclosure, the deriving the refined prediction sample for the current block may comprise clipping the BDOF offset in a predetermined range, and the predetermined range may be set based on a bit depth of the current block.

An image decoding apparatus according to another aspect of the present disclosure may comprise a memory and at least one processor. The at least one processor may comprise may derive a prediction sample of a current block based on motion information of the current block, determine whether bi-directional optical flow (BDOF) applies to the current block, based on that the BDOF applies to the current block, derive a gradient for a current subblock in the current block, derive motion refinement ($v_x$, $v_y$) for the current subblock based on the gradient, derive a BDOF offset based on the gradient and the motion refinement, and derive a refined prediction sample for the current block based on the prediction sample of the current block and the BDOF offset.

An image encoding method according to another aspect of the present disclosure may comprise deriving a prediction sample of a current block based on motion information of the current block, determining whether bi-directional optical flow (BDOF) applies to the current block, based on that the BDOF applies to the current block, deriving a gradient for a current subblock in the current block, deriving motion refinement ($v_x$, $v_y$) for the current subblock based on the gradient;

deriving a BDOF offset based on the gradient and the motion refinement, and deriving a refined prediction sample for the current block based on the prediction sample of the current block and the BDOF offset.

Also, a transmission method according to another aspect of the present disclosure may transmit a bitstream generated by an image encoding apparatus or method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for deriving a BDOF offset.

Also, according to the present disclosure, it is possible to provide an image encoding/decoding method and apparatus for performing BDOF.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 15 is a view illustrating a process of deriving a prediction sample of a current block by applying BDOF.

FIG. 16 is a view illustrating input and output of a BDOF process according to an embodiment of the present disclosure.

FIG. 17 is a view illustrating variables used for a BDOF process according to an embodiment of the present disclosure.

FIG. 18 is a view illustrating a method of generating a prediction sample for each subblock in a current CU based on whether to apply BDOF according to an embodiment of the present disclosure.

FIG. 19 is a view illustrating a method of deriving a gradient, auto-correlation and cross-correlation of a current subblock according to an embodiment of the present disclosure.

FIG. 20 is a view illustrating a method of deriving motion refinement ($v_x$, $v_y$), deriving a BDOF offset and generating a prediction sample of a current subblock, according to an embodiment of the present disclosure.

FIG. 21 is a view illustrating variables used for a BDOF process according to another embodiment of the present disclosure.

FIG. 22 is a view illustrating a method of deriving a gradient, auto-correlation and cross-correlation of a current subblock according to another embodiment of the present disclosure.

FIG. 23 is a view illustrating a method of deriving motion refinement ($v_x$, $v_y$), deriving a BDOF offset and generating a prediction sample of a current subblock, according to another embodiment of the present disclosure.

FIG. 24 is a view illustrating variables used for a BDOF process according to another embodiment of the present disclosure.

FIG. 25 is a view illustrating a method of deriving a gradient, auto-correlation and cross-correlation of a current subblock according to another embodiment of the present disclosure.

FIG. 26 is a view illustrating variables used for a BDOF process according to another embodiment of the present disclosure.

FIG. 27 is a view illustrating a method of deriving a gradient, auto-correlation and cross-correlation of a current subblock according to another embodiment of the present disclosure.

MODE FOR INVENTION

Figure 1:
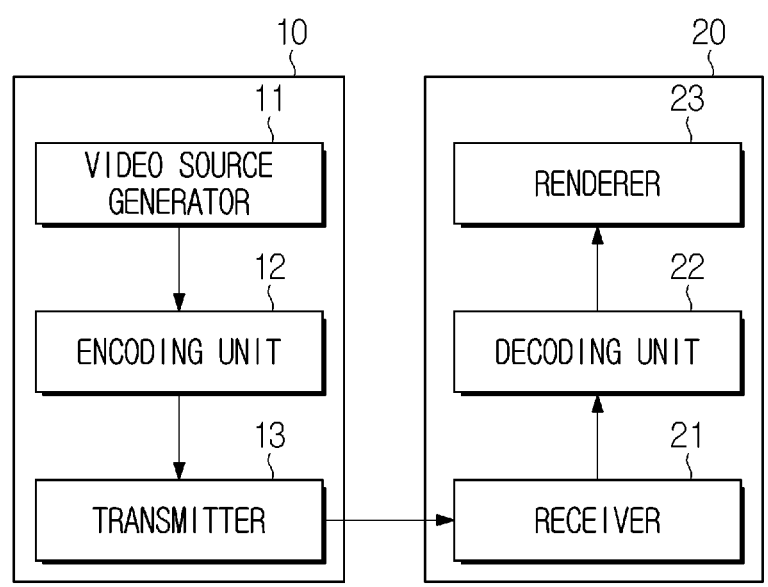
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
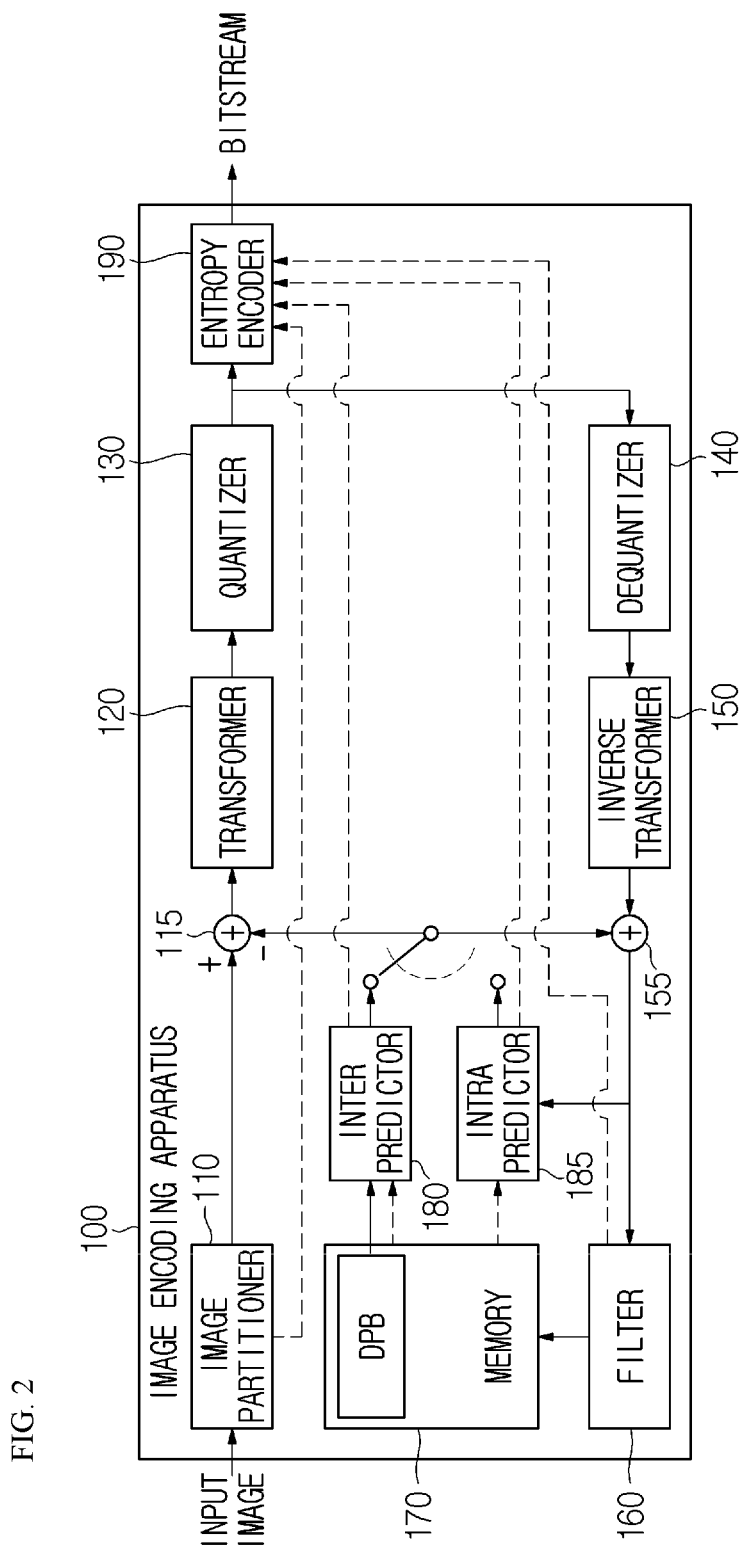
FIG. 2 is a view schematically illustrating an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described below, luma mapping with chroma scaling (LMCS) is applicable in a picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
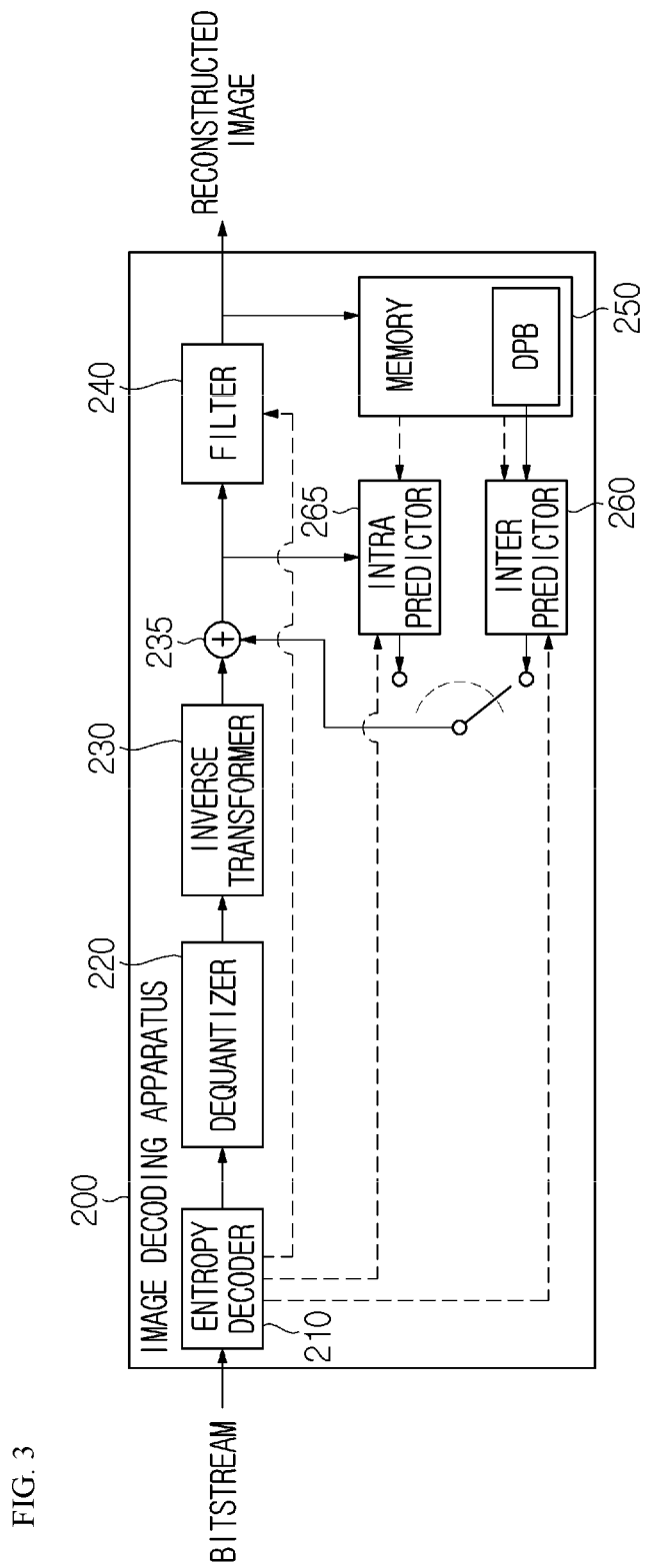
FIG. 3 is a view schematically illustrating an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235.

Meanwhile, as described below, luma mapping with chroma scaling (LMCS) is applicable in a picture decoding process.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Inter Prediction

An image encoding apparatus/image decoding apparatus may perform inter prediction in units of blocks to derive a prediction sample. Inter prediction may mean prediction derived in a manner that is dependent on data elements of picture(s) other than a current picture. When inter prediction applies to the current block, a predicted block for the current block may be derived based on a reference block specified by a motion vector on a reference picture.

In this case, in order to reduce the amount of motion information transmitted in an inter prediction mode, motion information of the current block may be derived based on correlation of motion information between a neighboring block and the current block, and motion information may be derived in units of blocks, subblocks or samples. The motion information may include a motion vector and a reference picture index. The motion information may further include inter prediction type information. Here, the inter prediction type information may mean directional information of inter prediction. The inter prediction type information may indicate that a current block is predicted using one of L0 prediction, L1 prediction or Bi-prediction.

When applying inter prediction to the current block, the neighboring block of the current block may include a spatial neighboring block present in the current picture and a temporal neighboring block present in the reference picture. A reference picture including the reference block for the current block and a reference picture including the temporal neighboring block may be the same or different. The temporal neighboring block may be referred to as a collocated reference block or collocated CU (colCU), and the reference picture including the temporal neighboring block may be referred to as a collocated picture (colPic).

Meanwhile, a motion information candidate list may be constructed based on the neighboring blocks of the current block, and, in this case, flag or index information indicating which candidate is used may be signaled in order to derive the motion vector of the current block and/or the reference picture index.

The motion information may include L0 motion information and/or L1 motion information according to the inter prediction type. The motion vector in an L0 direction may be defined as an L0 motion vector or MVL0, and the motion vector in an L1 direction may be defined as an L1 motion vector or MVL1. Prediction based on the L0 motion vector may be defined as L0 prediction, prediction based on the L1 motion vector may be defined as L1 prediction, and prediction based both the L0 motion vector and the L1 motion vector may be defined as Bi-prediction. Here, the L0 motion vector may mean a motion vector associated with a reference picture list L0 and the L1 motion vector may mean a motion vector associated with a reference picture list L1.

The reference picture list L0 may include pictures before the current picture in output order as reference pictures, and the reference picture list L1 may include pictures after the current picture in output order. The previous pictures may be defined as forward (reference) pictures and the subsequent pictures may be defined as backward (reference) pictures. Meanwhile, the reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 4:
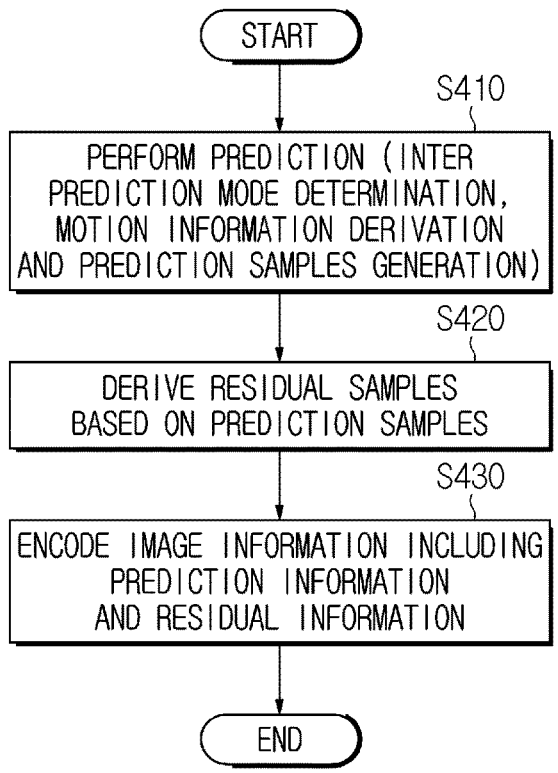
FIG. 4 is a flowchart illustrating an inter prediction based video/image encoding method.

FIG. 4 is a flowchart illustrating an inter prediction based video/image encoding method.

Figure 5:
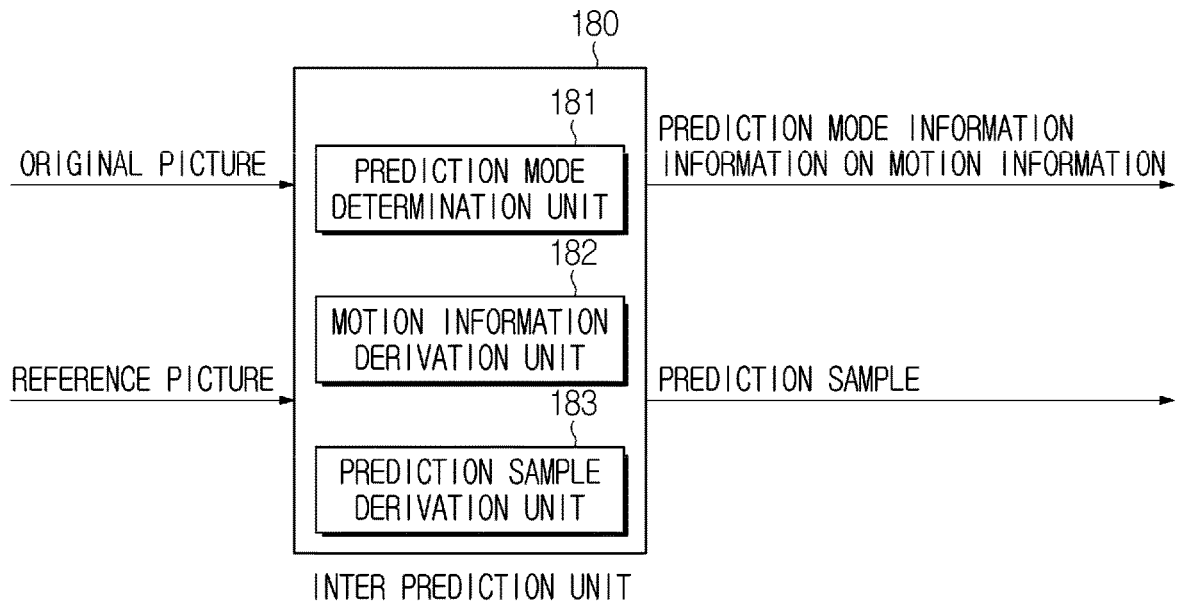
FIG. 5 is a view illustrating the configuration of an inter prediction unit 180 according to the present disclosure.

FIG. 5 is a view illustrating the configuration of an inter predictor 180 according to the present disclosure.

Figure 6:
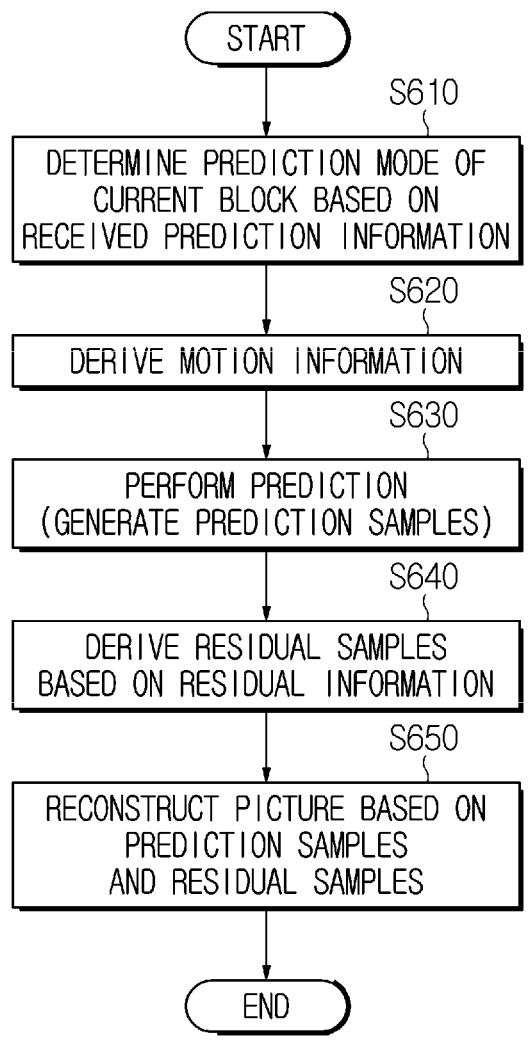
FIG. 6 is a flowchart illustrating an inter prediction based video/image decoding method.

The encoding method of FIG. 6 may be performed by the image encoding apparatus of FIG. 2. Specifically, step S410 may be performed by the inter predictor 180, and step S420 may be performed by the residual processor. Specifically, step S420 may be performed by the subtractor 115. Step S430 may be performed by the entropy encoder 190. The prediction information of step S630 may be derived by the inter predictor 180, and the residual information of step S630 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficient may be derived as quantized transform coefficients through the quantizer 130. Information on the quantized transform coefficients may be encoded by the entropy encoder 190 through a residual coding procedure.

The image encoding apparatus may perform inter prediction with respect to a current block (S410). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, as shown in FIG. 5, the inter prediction unit 180 of the image encoding apparatus may include a prediction mode determination unit 181, a motion information derivation unit 182 and a prediction sample derivation unit 183. The prediction mode determination unit 181 may determine the prediction mode of the current block, the motion information derivation unit 182 may derive the motion information of the current block, and the prediction sample derivation unit 183 may derive the prediction samples of the current block. For example, the inter prediction unit 180 of the image encoding apparatus may search for a block similar to the current block within a predetermined area (search area) of reference pictures through motion estimation, and derive a reference block whose difference from the current block is equal to or less than a predetermined criterion or a minimum. Based on this, a reference picture index indicating a reference picture in which the reference block is located may be derived, and a motion vector may be derived based on a position difference between the reference block and the current block. The image encoding apparatus may determine a mode applying to the current block among various inter prediction modes. The image encoding apparatus may compare rate-distortion (RD) costs for the various prediction modes and determine an optimal inter prediction mode of the current block. However, the method of determining the inter prediction mode of the current block by the image encoding apparatus is not limited to the above example, and various methods may be used.

For example, the inter prediction mode of the current block may be determined to be at least one of a merge mode, a merge skip mode, a motion vector prediction (MVP) mode, a symmetric motion vector difference (SMVD) mode, an affine mode, a subblock-based merge mode, an adaptive motion vector resolution (AMVR) mode, a history-based motion vector predictor (HMVP) mode, a pair-wise average merge mode, a merge mode with motion vector differences (MMVD) mode, a decoder side motion vector refinement (DMVR) mode, a combined inter and intra prediction (CIIP) mode or a geometric partitioning mode (GPM). For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose difference from the current block is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (MVP) candidates from the neighboring blocks of the current block and construct an MVP candidate list using the derived MVP candidates. In addition, the image encoding apparatus may use the motion vector of the MVP candidate selected from among the MVP candidates included in the MVP candidate list as the MVP of the current block. In this case, for example, the motion vector indicating the reference block derived by the above-described motion estimation may be used as the motion vector of the current block, an MVP candidate with a motion vector having a smallest difference from the motion vector of the current block among the MVP candidates may be the selected MVP candidate. A motion vector difference (MVD) which is a difference obtained by subtracting the MVP from the motion vector of the current block may be derived. In this case, index information indicating the selected MVP candidate and information on the MVD may be signaled to the image decoding apparatus. In addition, when applying the MVP mode, the value of the reference picture index may be constructed as reference picture index information and separately signaled to the image decoding apparatus.

The image encoding apparatus may derive residual samples based on the prediction samples (S420). The image encoding apparatus may derive the residual samples through comparison between original samples of the current block and the prediction samples. For example, the residual sample may be derived by subtracting a corresponding prediction sample from an original sample.

The image encoding apparatus may encode image information including prediction information and residual information (S430). The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag indicates whether a skip mode applies to the current block, and the merge flag indicates whether the merge mode applies to the current block. Alternatively, the prediction mode information may indicate one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the MVP flag or the MVP index may be signaled when the MVP mode applies to the current block and may be information for selecting one of MVP candidates in an MVP candidate list. Specifically, the MVP flag may be signaled using a syntax element mvp_10_flag or mvp_11_flag. In addition, the information on the motion information may include information on the above-described MVD and/or reference picture index information. In addition, the information on the motion information may include information indicating whether to apply L0 prediction, L1 prediction or Bi-prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

FIG. 6 is a flowchart illustrating an inter prediction based video/image decoding method.

Figure 7:
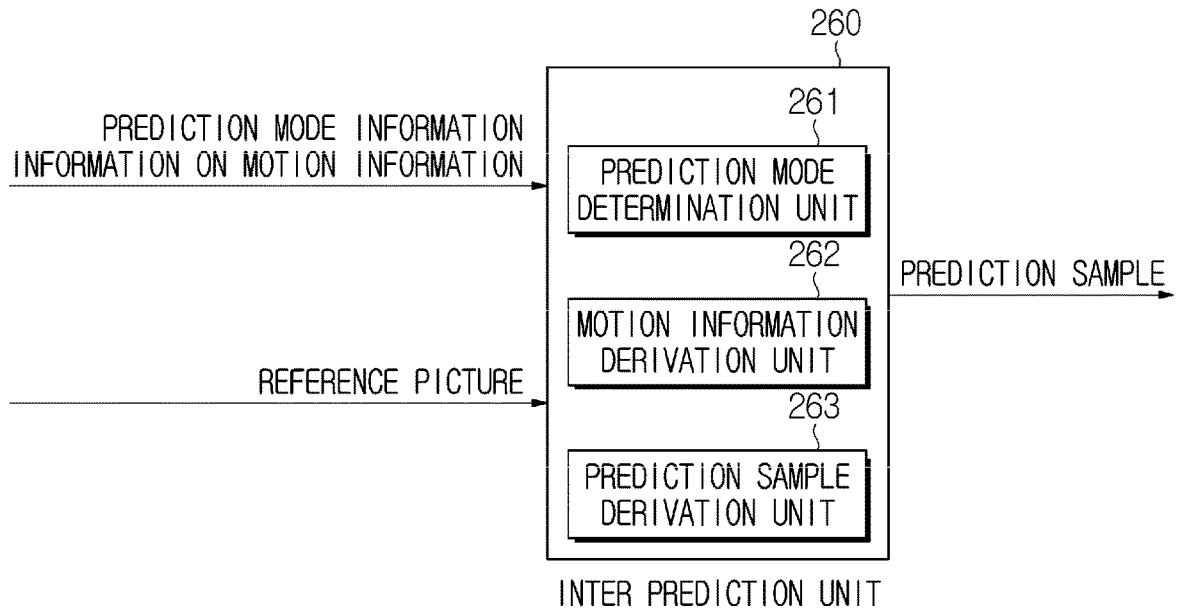
FIG. 7 is a view illustrating the configuration of an inter prediction unit 260 according to the present disclosure.

FIG. 7 is a view illustrating the configuration of an inter prediction unit 260 according to the present disclosure.

The image decoding apparatus may perform operation corresponding to operation performed by the image encoding apparatus. The image decoding apparatus may perform prediction with respect to a current block based on received prediction information and derive prediction samples.

The decoding method of FIG. 6 may be performed by the image decoding apparatus of FIG. 3. Steps S610 to S630 may be performed by the inter prediction unit 260, and the prediction information of step S610 and the residual information of step S640 may be obtained from a bitstream by the entropy decoder 210. The residual processor of the image decoding apparatus may derive residual samples for a current block based on the residual information (S640). Specifically, the dequantizer 220 of the residual processor may perform dequantization based on quantized transform coefficients derived based on the residual information to derive transform coefficients, and the inverse transformer 230 of the residual processor may perform inverse transform with respect to the transform coefficients to derive the residual samples for the current block. Step S650 may be performed by the adder 235 or the reconstructor.

Specifically, the image decoding apparatus may determine the prediction mode of the current block based on the received prediction information (S610). The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

The image decoding apparatus may derive the motion information of the current block based on the determined inter prediction mode (S620). For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. For example, the motion information of the selected merge candidate may be used as the motion information of the current block.

As another example, when the MVP mode applies to the current block, the image decoding apparatus may construct an MVP candidate list and use the motion vector of an MVP candidate selected from among MVP candidates included in the MVP candidate list as an MVP of the current block. The selection may be performed based on the above-described candidate selection information (mvp flag or mvp index). In this case, the MVD of the current block may be derived based on information on the MVD, and the motion vector of the current block may be derived based on MVP and MVD of the current block. In addition, the reference picture index of the current block may be derived based on the reference picture index information. A picture indicated by the reference picture index in the reference picture list of the current block may be derived as a reference picture referenced for inter prediction of the current block.

The image decoding apparatus may generate prediction samples of the current block based on motion information of the current block (S630). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed with respect to all or some of the prediction samples of the current block.

For example, as shown in FIG. 7, the inter prediction unit 260 of the image decoding apparatus may include a prediction mode determination unit 261, a motion information derivation unit 262 and a prediction sample derivation unit 263. In the inter prediction unit 260 of the image decoding apparatus, the prediction mode determination unit 261 may determine the prediction mode of the current block based on the received prediction mode information, the motion information derivation unit 262 may derive the motion information (a motion vector and/or a reference picture index, etc.) of the current block based on the received motion information, and the prediction sample derivation unit 263 may derive the prediction samples of the current block.

The image decoding apparatus may generate residual samples of the current block based the received residual information (S640). The image decoding apparatus may generate the reconstructed samples of the current block based on the prediction samples and the residual samples and generate a reconstructed picture based on this (S650). Thereafter, an in-loop filtering procedure is applicable to the reconstructed picture as described above.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the image encoding apparatus and the image decoding apparatus, as described above.

Hereinafter, the step of deriving the motion information according to the prediction mode will be described in greater detail.

As described above, inter prediction may be performed using motion information of a current block. An image encoding apparatus may derive optimal motion information of a current block through a motion estimation procedure. For example, the image encoding apparatus may search for a similar reference block with high correlation within a predetermined search range in the reference picture using an original block in an original picture for the current block in fractional pixel unit, and derive motion information using the same. Similarity of the block may be calculated based on a sum of absolute differences (SAD) between the current block and the reference block. In this case, motion information may be derived based on a reference block with a smallest SAD in the search area. The derived motion information may be signaled to an image decoding apparatus according to various methods based on an inter prediction mode.

When a merge mode applies to a current block, motion information of the current block is not directly transmitted and motion information of the current block is derived using motion information of a neighboring block. Accordingly, motion information of a current prediction block may be indicated by transmitting flag information indicating that the merge mode is used and candidate selection information (e.g., a merge index) indicating which neighboring block is used as a merge candidate. In the present disclosure, since the current block is a unit of prediction performance, the current block may be used as the same meaning as the current prediction block, and the neighboring block may be used as the same meaning as a neighboring prediction block.

The image encoding apparatus may search for merge candidate blocks used to derive the motion information of the current block to perform the merge mode. For example, up to five merge candidate blocks may be used, without being limited thereto. The maximum number of merge candidate blocks may be transmitted in a slice header or a tile group header, without being limited thereto. After finding the merge candidate blocks, the image encoding apparatus may generate a merge candidate list and select a merge candidate block with smallest RD cost as a final merge candidate block.

The present disclosure provides various embodiments for the merge candidate blocks configuring the merge candidate list. The merge candidate list may use, for example, five merge candidate blocks. For example, four spatial merge candidates and one temporal merge candidate may be used.

Figure 8:
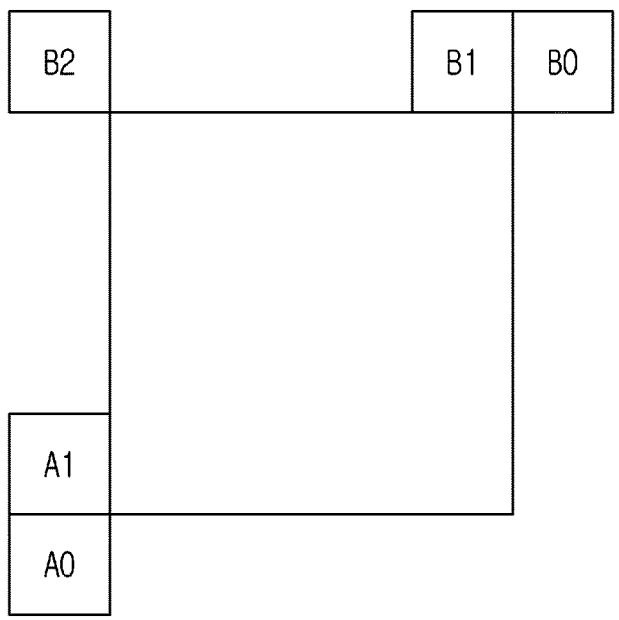
FIG. 8 is a view illustrating neighboring blocks available as a spatial merge candidate.

FIG. 8 is a view illustrating neighboring blocks available as a spatial merge candidate.

Figure 9:
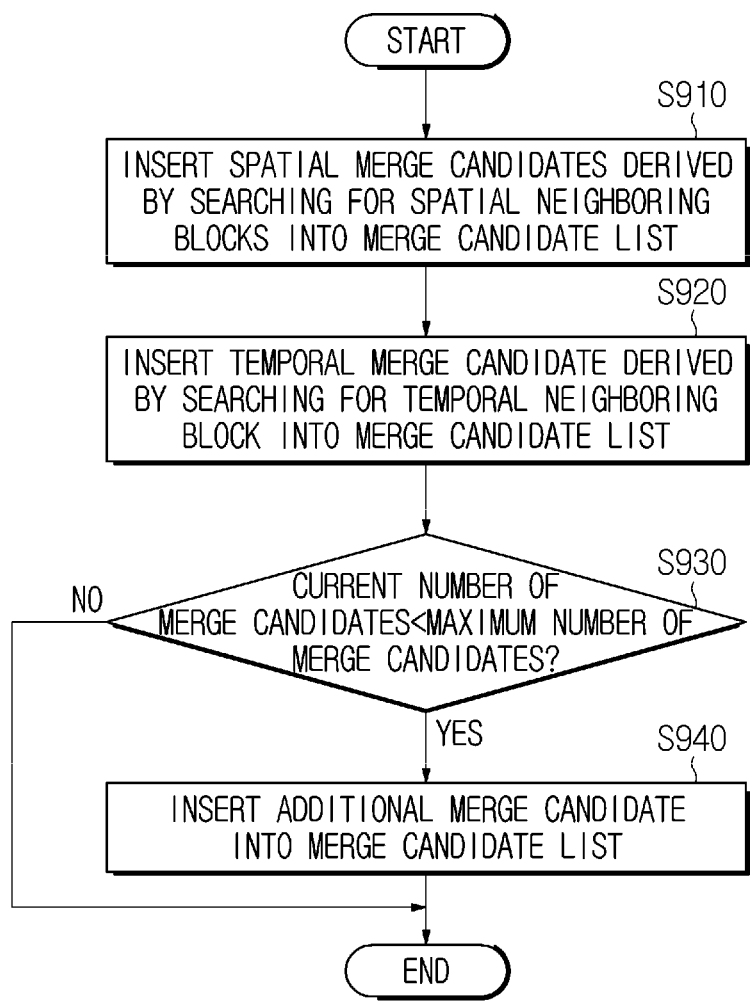
FIG. 9 is a view schematically illustrating a merge candidate list construction method according to an example of the present disclosure.

FIG. 9 is a view schematically illustrating a merge candidate list construction method according to an example of the present disclosure.

An image encoding/decoding apparatus may insert, into a merge candidate list, spatial merge candidates derived by searching for spatial neighboring blocks of a current block (S910). For example, as shown in FIG. 8, the spatial neighboring blocks may include a bottom-left corner neighboring block $A_0$, a left neighboring block $A_1$, a top-right corner neighboring block $B_0$, a top neighboring block $B_1$, and a top-left corner neighboring block $B_2$ of the current block. However, this is an example and, in addition to the above-described spatial neighboring blocks, additional neighboring blocks such as a right neighboring block, a bottom neighboring block and a bottom-right neighboring block may be further used as the spatial neighboring blocks. The image encoding/decoding apparatus may detect available blocks by searching for the spatial neighboring blocks based on priority and derive motion information of the detected blocks as the spatial merge candidates. For example, the image encoding/decoding apparatus may construct a merge candidate list by searching for the five blocks shown in FIG. 8 in order of $A_1$, $B_1$, $B_0$, $A_0$ and $B_2$ and sequentially indexing available candidates.

The image encoding/decoding apparatus may insert, into the merge candidate list, a temporal merge candidate derived by searching for temporal neighboring blocks of the current block (S920). The temporal neighboring blocks may be located on a reference picture which is different from a current picture in which the current block is located. A reference picture in which the temporal neighboring block is located may be referred to as a collocated picture or a col picture. The temporal neighboring block may be searched for in order of a bottom-right corner neighboring block and a bottom-right center block of the co-located block for the current block on the col picture. Meanwhile, when applying motion data compression in order to reduce memory load, specific motion information may be stored as representative motion information for each predetermined storage unit for the col picture. In this case, motion information of all blocks in the predetermined storage unit does not need to be stored, thereby obtaining motion data compression effect. In this case, the predetermined storage unit may be predetermined as, for example, 16×16 sample unit or 8×8 sample unit or size information of the predetermined storage unit may be signaled from the image encoding apparatus to the image decoding apparatus. When applying the motion data compression, the motion information of the temporal neighboring block may be replaced with the representative motion information of the predetermined storage unit in which the temporal neighboring block is located. That is, in this case, from the viewpoint of implementation, the temporal merge candidate may be derived based on the motion information of a prediction block covering an arithmetic left-shifted position after an arithmetic right shift by a predetermined value based on coordinates (top-left sample position) of the temporal neighboring block, not a prediction block located on the coordinates of the temporal neighboring block. For example, when the predetermined storage unit is a 2"×2" sample unit and the coordinates of the temporal neighboring block are (xTnb, yTnb), the motion information of a prediction block located at a modified position ((xTnb>>n)<<n), (yTnb>>n)<<n)) may be used for the temporal merge candidate. Specifically, for example, when the predetermined storage unit is a 16×16 sample unit and the coordinates of the temporal neighboring block are (xTnb, yTnb), the motion information of a prediction block located at a modified position ((xTnb>>4)<<4), (yTnb>>4)<<4)) may be used for the temporal merge candidate. Alternatively, for example, when the predetermined storage unit is an 8×8 sample unit and the coordinates of the temporal neighboring block are (xTnb, yTnb), the motion information of a prediction block located at a modified position ((xTnb>>3)<<3), (yTnb>>3)<<3)) may be used for the temporal merge candidate.

Referring to FIG. 9 again, the image encoding/decoding apparatus may check whether the current number of merge candidates is less than a maximum number of merge candidates (S930). The maximum number of merge candidates may be predefined or signaled from the image encoding apparatus to the image decoding apparatus. For example, the image encoding apparatus may generate and encode information on the maximum number of merge candidates and transmit the encoded information to the image decoding apparatus in the form of a bitstream. When the maximum number of merge candidates is satisfied, a subsequent candidate addition process S940 may not be performed.

When the current number of merge candidates is less than the maximum number of merge candidates as a checked result of step S930, the image encoding/decoding apparatus may derive an additional merge candidate according to a predetermined method and then insert the additional merge candidate to the merge candidate list (S940). The additional merge candidate may include, for example, at least one of history based merge candidate(s), pair-wise average merge candidate(s), ATMVP, combined bi-predictive merge candidate(s) (when a slice/tile group type of a current slice/tile group is a B type) and/or zero vector merge candidate(s).

When the current number of merge candidates is not less than the maximum number of merge candidates as a checked result of step S930, the image encoding/decoding apparatus may end the construction of the merge candidate list. In this case, the image encoding apparatus may select an optimal merge candidate from among the merge candidates configuring the merge candidate list, and signal candidate selection information (e.g., merge candidate index or merge index) indicating the selected merge candidate to the image decoding apparatus. The image decoding apparatus may select the optimal merge candidate based on the merge candidate list and the candidate selection information.

The motion information of the selected merge candidate may be used as the motion information of the current block, and the prediction samples of the current block may be derived based on the motion information of the current block, as described above. The image encoding apparatus may derive the residual samples of the current block based on the prediction samples and signal residual information of the residual samples to the image decoding apparatus. The image decoding apparatus may generate reconstructed samples based on the residual samples derived based on the residual information and the prediction samples and generate the reconstructed picture based on the same, as described above.

When applying a skip mode to the current block, the motion information of the current block may be derived using the same method as the case of applying the merge mode. However, when applying the skip mode, a residual signal for a corresponding block is omitted and thus the prediction samples may be directly used as the reconstructed samples. The above skip mode may apply, for example, when the value of cu_skip_flag is 1.

Hereinafter, a method of deriving a spatial candidate in a merge mode and/or a skip mode will be described. The spatial candidate may represent the above-described spatial merge candidate.

Derivation of the spatial candidate may be performed based on spatially neighboring blocks. For example, a maximum of four spatial candidates may be derived from candidate blocks existing at positions shown in FIG. 8. The order of deriving spatial candidates may be A1→B1→B0→A0→B2. However, the order of deriving spatial candidates is not limited to the above order and may be, for example, B1→A1→B0→A0→B2. The last position in the order (position B2 in the above example) may be considered when at least one of the preceding four positions (A1, B1, B0 and A0 in the above example) is not available. In this case, a block at a predetermined position being not available may include a corresponding block belonging to a slice or tile different from the current block or a corresponding block being an intra-predicted block. When a spatial candidate is derived from a first position in the order (A1 or B1 in the above example), redundancy check may be performed on spatial candidates of subsequent positions. For example, when motion information of a subsequent spatial candidate is the same as motion information of a spatial candidate already included in a merge candidate list, the subsequent spatial candidate may not be included in the merge candidate list, thereby improving encoding efficiency. Redundancy check performed on the subsequent spatial candidate may be performed on some candidate pairs instead of all possible candidate pairs, thereby reducing computational complexity.

Figure 10:
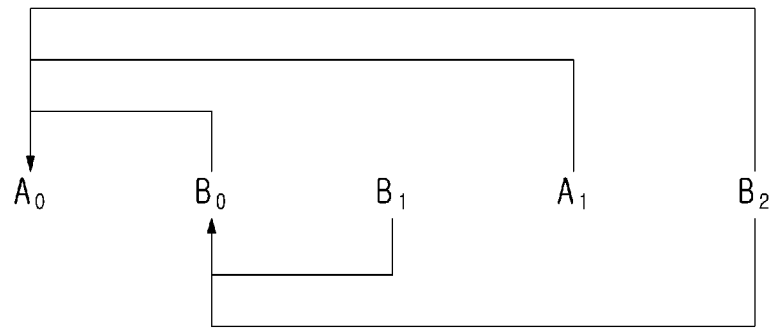
FIG. 10 is a view illustrating a candidate pair for redundancy check performed on a spatial candidate.

FIG. 10 is a view illustrating a candidate pair for redundancy check performed on a spatial candidate.

In the example shown in FIG. 10, redundancy check for a spatial candidate at a position $B_0$ may be performed only for a spatial candidate at a position $A_0$. In addition, redundancy check for a spatial candidate at a position $B_1$ may be performed only for a spatial candidate at a position $B_0$. In addition, redundancy check for a spatial candidate at a position $A_1$ may be performed only for a spatial candidate at a position $A_0$. Finally, redundancy check for a spatial candidate at a position $B_2$ may be performed only for spatial candidates at a position $A_0$ and a position $B_0$.

In the example shown in FIG. 10, the order of deriving the spatial candidates is A0→B0→B1→A1→B2. However, the present disclosure is not limited thereto and, even if the order of deriving the spatial candidates is changed, as in the example shown in FIG. 10, redundancy check may be performed only on some candidate pairs.

Hereinafter, a method of deriving a temporal candidate in the case of a merge mode and/or a skip mode will be described. The temporal candidate may represent the above-described temporal merge candidate. In addition, the motion vector of the temporal candidate may correspond to the temporal candidate of an MVP mode.

In the case of the temporal candidate, only one candidate may be included in a merge candidate list. In the process of deriving the temporal candidate, the motion vector of the temporal candidate may be scaled. For example, the scaling may be performed based on a collocated block (CU) (hereinafter referred to as a "col block") belonging to a collocated reference picture (colPic) (hereinafter referred to as "col picture"). A reference picture list used to derive the col block may be explicitly signaled in a slice header.

Figure 11:
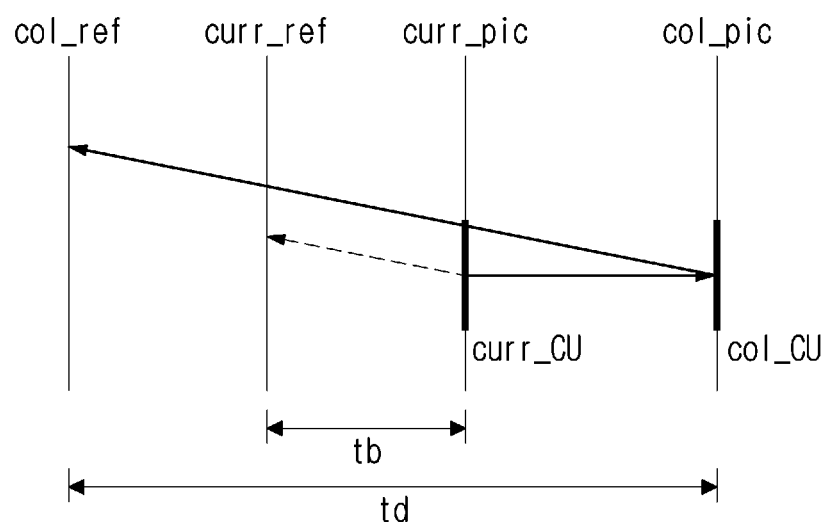
FIG. 11 is a view illustrating a method of scaling a motion vector of a temporal candidate.

FIG. 11 is a view illustrating a method of scaling a motion vector of a temporal candidate.

In FIG. 11, curr_CU and curr_pic respectively denote a current block and a current picture, and col_CU and col_pic respectively denote a col block and a col picture. In addition, curr_ref denote a reference picture of a current block, and col_ref denotes a reference picture of a col block. In addition, tb denotes a distance between the reference picture of the current block and the current picture, and td denotes a distance between the reference picture of the col block and the col picture. tb and td may denote values corresponding to differences in POC (Picture Order Count) between pictures. Scaling of the motion vector of the temporal candidate may be performed based on tb and td. In addition, the reference picture index of the temporal candidate may be set to 0.

Figure 12:
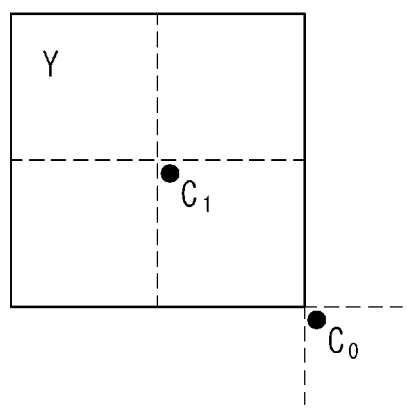
FIG. 12 is a view illustrating a position where a temporal candidate is derived.

FIG. 12 is a view illustrating a position where a temporal candidate is derived.

In FIG. 12, a block with a thick solid line denotes a current block. A temporal candidate may be derived from a block in a col picture corresponding to a position $C_0$ (bottom-right position) or $C_1$ (center position) of FIG. 12. First, it may be determined whether the position $C_0$ is available and, when the position $C_0$ is available, the temporal candidate may be derived based on the position $C_0$. When the position $C_0$ is not available, the temporal candidate may be derived based on the position $C_1$. For example, when a block in the col picture at the position $C_0$ is an intra-predicted block or is located outside a current CTU row, it may be determined that the position $C_0$ is not available.

As described above, when applying motion data compression, the motion vector of the col block may be stored for each predetermined unit block. In this case, in order to derive the motion vector of a block covering the position $C_0$ or the position $C_1$, the position $C_0$ or the position $C_1$ may be modified. For example, when the predetermined unit block is an 8×8 block and the position $C_0$ or the position $C_0$ is (xColCi, yColCi), a position for deriving the temporal candidate may be modified to ((xColCi>>3)<<3, (yColCi>>3)<<3).

Hereinafter, a method of deriving a history-based candidate in the case of a merge mode and/or a skip mode will be described. The history-based candidate may be expressed by a history-based merge candidate.

The history-based candidate may be added to a merge candidate list after a spatial candidate and a temporal candidate are added to the merge candidate list. For example, motion information of a previously encoded/decoded block may be stored at a table and used as a history-based candidate of a current block. The table may store a plurality of history-based candidates during the encoding/decoding process. The table may be initialized when a new CTU row starts. Initializing the table may mean that the corresponding table is emptied by deleting all the history-based candidates stored in the table. Whenever there is an inter-predicted block, related motion information may be added to the table as a last entry. In this case, the inter-predicted block may not be a block predicted based on a subblock. The motion information added to the table may be used as a new history-based candidate.

The table of the history-based candidates may have a predetermined size. For example, the size may be 5. In this case, the table may store a maximum of five history-based candidates. When a new candidate is added to the table, a limited first-in-first-out (FIFO) rule in which redundancy check of checking whether the same candidate is present in the table may apply. If the same candidate is already present in the table, the same candidate may be deleted from the table and positions of all subsequent history-based candidates may be moved forward.

The history-based candidate may be used in a process of configuring the merge candidate list. In this case, the history-based candidates recently included in the table may be sequentially checked and located at a position after the temporal candidate of the merge candidate list. When the history-based candidate is included in the merge candidate list, redundancy check with the spatial candidates or temporal candidates already included in the merge candidate list may be performed. If the spatial candidate or temporal candidate already included in the merge candidate list and the history-based candidate overlap, the history-based candidate may not be included in the merge candidate list. By simplifying the redundancy check as follows, the amount of computation may be reduced.

The number of history-based candidates used to generate the merge candidate list may be set to (N<=4)? M: (8−N). In this case, N may denote the number of candidates already included in the merge candidate list, and M may denote the number of available history-based candidate included in the table. That is, when 4 or less candidates are included in the merge candidate list, the number of history-based candidates used to generate the merge candidate list may be M, and, when N candidates greater than 4 are included in the merge candidate list, the number of history-based candidates used to generate the merge candidate list may be set to (8−N).

When the total number of available merge candidates reaches (maximum allowable number of merge candidates—1), configuration of the merge candidate list using the history-based candidate may end.

Hereinafter, a method of deriving a pair-wise average candidate in the case of a merge mode and/or a skip mode will be described. The pair-wise average candidate may be represented by a pair-wise average merge candidate or a pair-wise candidate.

The pair-wise average candidate may be generated by obtaining predefined candidate pairs from the candidates included in the merge candidate list and averaging them. The predefined candidate pairs may be {(0, 1), (0, 2), (1, 2), (0, 3), (1, 3), (2, 3)} and the number configuring each candidate pair may be an index of the merge candidate list. That is, the predefined candidate pair (0, 1) may mean a pair of index 0 candidate and index 1 candidate of the merge candidate list, and the pair-wise average candidate may be generated by an average of index 0 candidate and index 1 candidate. Derivation of pair-wise average candidates may be performed in the order of the predefined candidate pairs. That is, after deriving a pair-wise average candidate for the candidate pair (0, 1), the process of deriving the pair-wise average candidate may be performed in order of the candidate pair (0, 2)

and the candidate pair (1, 2). The pair-wise average candidate derivation process may be performed until configuration of the merge candidate list is completed. For example, the pair-wise average candidate derivation process may be performed until the number of merge candidates included in the merge candidate list reaches a maximum merge candidate number.

The pair-wise average candidate may be calculated separately for each reference picture list. When two motion vectors are available for one reference picture list (L0 list or L1 list), an average of the two motion vectors may be computed. In this case, even if the two motion vectors indicate different reference pictures, an average of the two motion vectors may be performed. If only one motion vector is available for one reference picture list, an available motion vector may be used as a motion vector of a pair-wise average candidate. If both the two motion vectors are not available for one reference picture list, it may be determined that the reference picture list is not valid.

When configuration of the merge candidate list is not completed even after the pair-wise average candidate is included in the merge candidate list, a zero vector may be added to the merge candidate list until the maximum merge candidate number is reached.

When applying an MVP mode to the current block, a motion vector predictor (mvp) candidate list may be generated using a motion vector of a reconstructed spatial neighboring block (e.g., the neighboring block shown in FIG. 8) and/or a motion vector corresponding to the temporal neighboring block (or Col block). That is, the motion vector of the reconstructed spatial neighboring blocks and the motion vector corresponding to the temporal neighboring blocks may be used as motion vector predictor candidates of the current block. When applying bi-prediction, an mvp candidate list for L0 motion information derivation and an mvp candidate list for L1 motion information derivation are individually generated and used. Prediction information (or information on prediction) of the current block may include candidate selection information (e.g., an MVP flag or an MVP index) indicating an optimal motion vector predictor candidate selected from among the motion vector predictor candidates included in the mvp candidate list. In this case, a prediction unit may select a motion vector predictor of a current block from among the motion vector predictor candidates included in the mvp candidate list using the candidate selection information. The prediction unit of the image encoding apparatus may obtain and encode a motion vector difference (MVD) between the motion vector of the current block and the motion vector predictor and output the encoded MVD in the form of a bitstream. That is, the MVD may be obtained by subtracting the motion vector predictor from the motion vector of the current block. The prediction unit of the image decoding apparatus may obtain a motion vector difference included in the information on prediction and derive the motion vector of the current block through addition of the motion vector difference and the motion vector predictor. The prediction unit of the image decoding apparatus may obtain or derive a reference picture index indicating a reference picture from the information on prediction.

Figure 13:
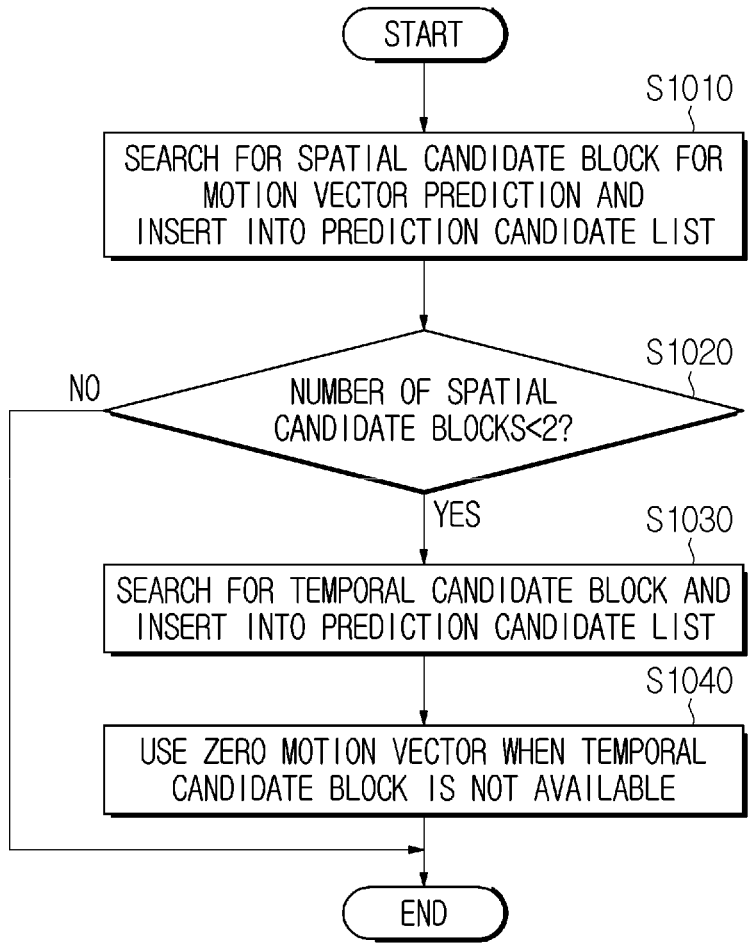
FIG. 13 is a view schematically illustrating a motion vector predictor candidate list configuration method according to an example of the present disclosure.

FIG. 13 is a view schematically illustrating a motion vector predictor candidate list construction method according to an example of the present disclosure.

First, a spatial candidate block of a current block may be searched for and available candidate blocks may be inserted into an MVP candidate list (S1010). Thereafter, it is determined whether the number of MVP candidates included in the MVP candidate list is less than 2 (S1020) and, when the number of MVP candidates is two, construction of the MVP candidate list may be completed.

In step S1020, when the number of available spatial candidate blocks is less than 2, a temporal candidate block of the current block may be searched for and available candidate blocks may be inserted into the MVP candidate list (S1030). When the temporal candidate blocks are not available, a zero motion vector may be inserted into the MVP candidate list (S1040), thereby completing construction of the MVP candidate list.

Meanwhile, when applying an mvp mode, a reference picture index may be explicitly signaled. In this case, a reference picture index refidxL0 for L0 prediction and a reference picture index refidxL1 for L1 prediction may be distinguishably signaled. For example, when applying the MVP mode and applying Bi-prediction, both information on refidxL0 and information on refidxL1 may be signaled.

As described above, when applying the MVP mode, information on MVP derived by the image encoding apparatus may be signaled to the image decoding apparatus. Information on the MVD may include, for example, an MVD absolute value and information indicating x and y components for a sign. In this case, when the MVD absolute value is greater than 0, whether the MVD absolute value is greater than 1 and information indicating an MVD remainder may be signaled stepwise. For example, information indicating whether the MVD absolute value is greater than 1 may be signaled only when a value of flag information indicating whether the MVD absolute value is greater than 0 is 1.

Hereinafter, an embodiment of a prediction performing method of the present disclosure will be described. The following prediction performing method may be performed in step S410 of FIG. 4 or step S630 of FIG. 6.

A predicted block for a current block may be generated based on motion information derived according to a prediction mode. The predicted block (prediction block) may include prediction samples (prediction sample array) of the current block. When the motion vector of the current block specifies a fractional sample unit, an interpolation procedure may be performed and, through this, prediction samples of the current block may be derived based on reference samples in units of fractional samples within a reference picture. When affine inter prediction applies to the current block, prediction samples may be generated based on a sample/subblock unit MV. When bi-prediction applies, prediction samples derived through a weighted sum or weighted average (according to phase) of prediction samples derived based on L0 prediction (that is, prediction using MVL0 and a reference picture within a reference picture list L0) and prediction samples derived based on L1 prediction (that is, prediction using MLVI and a reference picture within a reference picture list L1) may be used as the prediction samples of the current block. When applying bi-prediction and a reference picture used for L0 prediction and the reference picture used for L1 prediction are located in different temporal directions with respect to the current picture (that is, if it corresponds to bi-prediction and bi-directional prediction), this may be called true bi-prediction.

In an image decoding apparatus, reconstructed samples and a reconstructed picture may be generated based on the derived prediction samples and then an in-loop filtering procedure may be performed. In addition, in an image encoding apparatus, residual samples may be derived based on the derived prediction samples and encoding of image information including prediction information and residual information may be performed.

Bi-Directional Optical Flow (BDOF)

According to the present disclosure, BDOF may be used to refine a bi-prediction signal. BDOF is to generate prediction samples by calculating refined motion information when bi-prediction applies to a current block (e.g., CU). Accordingly, a process of calculating refined motion information by applying BDOF may be included in the above-described motion information derivation step.

For example, BDOF may apply at a 4×4 sub-block level. That is, BDOF may be performed within the current block in units of 4×4 sub-blocks.

BODF may, for example, apply to a CU satisfying at least one or all of the following conditions.
- the CU is encoded in a true bi-prediction mode, that is, one of two reference pictures precedes a current picture in display order and the other follows the current picture in display order
- the CU is not in an affine mode or an ATMVP merge mode
- the CU has 64 luma samples or more
- the height and width of the CU are 8 luma samples or more
- a BCW weight index specifies an equal weight, that is, applying an equal weight to an L0 prediction sample and an L1 prediction sample
- weighted prediction (WP) does not apply to a current CU
- a CIIP mode is used for the current CU In addition, BDOF may apply only to a luma component. However, the present disclosure is not limited thereto and BDOF may apply to a chroma component or both a luma component and a chroma component.

A BDOF mode is based on the concept of optical flow. That is, it is assumed that motion of an object is smooth. When applying BDOF, for each 4×4 sub-block, a motion refinement $(v_x, v_y)$ may be calculated. The motion refinement may be calculated by minimizing a difference between an L0 prediction sample and an L1 prediction sample. The motion refinement may be used to adjust bi-predicted sample values within a 4×4 sub-block.

Hereinafter, a process of performing BDOF will be described in greater detail.

First, horizontal gradients $$\frac{\partial I^{(k)}}{\partial x}(i, j)$$

and vertical gradients $$\frac{\partial I^{(k)}}{\partial y}(i, j)$$

of two prediction signals may be calculated. In this case, k may be 0 or 1. The gradients may be calculated by directly calculating a difference between two adjacent samples. For example, the gradients may be calculated as follows.

$$\frac{\partial I^{(k)}}{\partial x}(i, j) = \begin{pmatrix} (I^{(k)}(i+1, j) \gg \text{shift1}) - \\ ([(I^{(k)}(i-1, j) \gg \text{shift1}) \end{pmatrix} \quad \text{[Equation 1]}$$

$$\frac{\partial I^{(k)}}{\partial y}(i, j) = \begin{pmatrix} (I^{(k)}(i, j+1) \gg \text{shift1}) - \\ (I^{(k)}(i, j-1) \gg \text{shift1}) \end{pmatrix}$$

In Equation 1 above, $I^{(k)}(i, j)$ denotes a sample value of coordinates (i, j) of a prediction signal in a list k (k=0, 1). For example, $I^{(0)}(i, j)$ may denote a sample value at a position (i, j) in an L0 prediction block, and $I^{(1)}(i, j)$ may denote a sample value at a position (i, j) in an L1 prediction block. In Equation 1 above, the first shift shift1 may be determined based on a bit depth of a luma component. For example, when the bit depth of the luma component is bitDepth, shift1 may be determined to be max (6, bitDepth-6).

As described above, after calculating the gradients, auto-correlation and cross-correlation $S_1$, $S_2$, $S_3$, $S_5$ and $S_6$ between the gradients may be calculated as follows.

$$S_1 = \Sigma_{(i,j)\in\Omega}\text{Abs}(\psi_x(i,j)), S_3 = \Sigma_{(i,j)\in\Omega}\theta(i,j)\cdot\text{Sign}(\psi_x(i,j))$$
$$S_2 = \Sigma_{(i,j)\in\Omega}\psi_x(i,j)\cdot\text{Sign}(\psi_y(i,j)) S_5 = \Sigma_{(i,j)\in\Omega}$$
$$\text{Abs}(\psi_y(i,j)) S_6 = \Sigma_{(i,j)\in\Omega}\theta(i,j)\cdot\psi_y(i,j) \quad \text{[Equation 2]}$$

where $$\psi_x(i, j) = \left(\frac{\partial I^{(1)}}{\partial x}(i, j) + \frac{\partial I^{(0)}}{\partial x}(i, j)\right) \gg n_a$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = (I^{(1)}(i, j) \gg n_b) - (I^{(0)}(i, j) \gg n_b)$$

where $\Omega$ is a 6×6 window around the 4×4 sub-block.

In Equation 2 above, $n_a$ and $n_b$ may be set to min (1, bitDepth−11) and min (4, bitDepth−8), respectively.

The motion refinement $(v_x, v_y)$ may be derived as follows using the above-described auto-correlation and cross-correlation between the gradients.

$$v_x = S_1 > 0?\text{clip3}(-th'_{BIO}, th'_{BIO}, -(S_3 \cdot 2^{n_b-n_a}) \gg \lfloor \log_2 S_1 \rfloor)):$$
$$0 v_y = S_5 > 0?\text{clip3}(-th'_{BIO}, th'_{BIO}, -(S_6 \cdot 2^{n_b-n_a} - (v_x S_{2,m}) \ll n_{S_2} + v_x S_{2,s})/2) \gg \lfloor \log_2 S_5 \rfloor)):0 \quad \text{[Equation 3]}$$

where $S_{2,m}=S_2 \gg n_{S_2}$, $S\_(2,s)=S\_2\&(2^{(n\_(S\_2))}−1)$, $th'_{BIO}=2^{13-BD}$, and $\lfloor \cdot \rfloor$ is the floor function.

In Equation 3 above, $n_{S2}$ may be 12. Based on the derived motion refinement and gradients, the following adjustment may be performed with respect to each sample in the 4×4 sub-block.

$$b(x, y) = rnd\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right)/2\right) \quad \text{[Equation 4]}$$

Finally, prediction samples $\text{pred}_{BDOF}$ of a CU, to which BDOF applies, may be calculated by adjusting the bi-prediction samples of the CU as follows.

$$\text{pred}_{BDOF}(x,y) = (I^{(0)}(x,y) + I^{(1)}(x,y) + b(x,y) + o_{\text{offset}}) \gg \text{shift} \quad \text{[Equation 5]}$$

In above Equations, $n_a$, $n_b$ and $n_{S2}$ may be 3, 6 and 12, respectively. These values may be selected such that a multiplier does not exceed 15 bits in the BDOF process and bit-widths of intermediate parameters are maintained within 32 bits.

Figure 14:
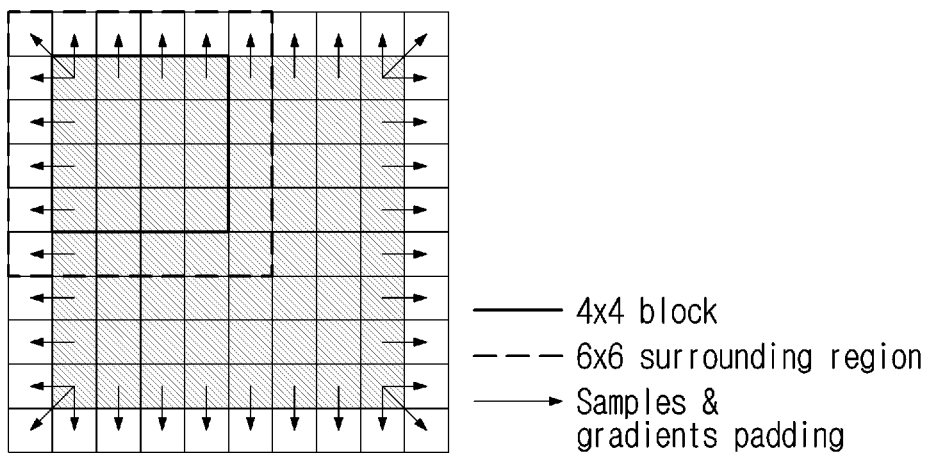
FIG. 14 is a view illustrating a CU extended to perform BDOF.

In order to derive a gradient value, prediction samples $I^{(k)}(i, j)$ in a list k (k=0, 1) existing outside a current CU may be generated. FIG. 14 is a view illustrating a CU extended to perform BDOF.

As shown in FIG. 14, in order to perform BDOF, rows/columns extending around the boundary of a CU may be used. In order to control computational complexity for generating prediction samples outside the boundary, prediction samples in an extended region (white region in FIG. 14) may be generated using a bilinear filter, and prediction samples in a CU (gray region in FIG. 14) may be generated using a normal 8-tap motion compensation interpolation filter. The sample values at the extended positions may be used only for gradient calculation. When sample values and/or gradient values located outside the CU boundary are required to perform the remaining steps of the BDOF process, nearest neighboring sample values and/or gradient values may be padded (repeated) and used.

When the width and/or height of the CU are greater than 16 luma samples, the corresponding CU may be split into sub-blocks having a width and/or height of 16 luma samples. The boundary of the sub-blocks may be treated in the same manner as the above-described CU boundary in the BDOF process. A maximum unit size in which the BDOF process is performed may be limited to 16×16.

For each subblock, whether BDOF is performed may be determined. That is, the BDOF process for each subblock may be skipped. For example, when an SAD value between an initial L0 prediction sample and an initial L1 prediction sample is less than a predetermined threshold, the BDOF process may not apply to the corresponding subblock. In this case, when the width and height of the corresponding subblock are W and H, the predetermined threshold may be set to $(8*W*(H>>1))$. In consideration of complexity of additional SAD calculation, the SAD between the initial L0 prediction sample and the initial L1 prediction sample calculated in the DMVR process may be reused.

When BCW is available for a current block, for example, when a BCW weight index specifies an unequal weight, BDOF may not apply. Similarly, when WP is available for the current block, for example, when luma_weight_lx_flag for at least one of two reference pictures is 1, BDOF may not apply. In this case, luma_weight_lx_flag may be information specifying whether weighting factors of WP for a luma component of lx prediction (x being 0 or 1) is present in a bitstream or information specifying whether WP applies to a luma component of lx prediction. When the CU is encoded in a symmetric MVD (SMVD) mode or a CIIP mode, BDOF may not apply.

As described above, by applying BDOF in an inter prediction process to refine a reference sample in a motion compensation process, it is possible to increase compression performance of an image. BDOF may be performed in a normal mode. That is, BDOF is not performed in case of an affine mode, a GPM mode or a CIIP mode.

The present disclosure proposes various methods capable of preventing potential errors of BDOF and improving performance by applying normalization and clipping when deriving a BDOF offset bdofOffset (b(x, y)) for refinement of a reference sample in a BDOF process. In the present disclosure, normalization may mean that values expressed in various units (e.g., 1/64-pel, 1/32-pel, 2-pel, etc.) are unified into a value in a predetermined unit (e.g., 1-pel). In addition, in the present disclosure, [a, b] may mean a range of values of a to b, and clipping a certain value x in a range of [a, b] may mean that the range of x is limited to have a value of a when x is less than a, a value of b when x is greater than b and a value of x in the other case. In addition, in the present disclosure, a bit depth is not limited to a bit depth of a luma component, and may include, for example, a bit depth when bit depths of a luma component and a chroma component are the same.

FIG. 15 is a view illustrating a process of deriving a prediction sample of a current block by applying BDOF.

The BDOF based inter prediction procedure of FIG. 15 may be performed by an image encoding apparatus and an image decoding apparatus.

First, in step S1510, motion information of a current block may be derived. The motion information of the current block may be derived by various methods described in the present disclosure. For example, the motion information of the current block may be derived by a regular merge mode, an MMVD mode or an AMVP mode. The motion information may include bi-prediction motion information (L0 motion information and L1 motion information). For example, the L0 motion information may include MVL0 (L0 motion vector) and refIdxL0 (L0 reference picture index), and the L1 motion information MVL1 (L1 motion vector) and refIdxL1 (L1 reference picture index).

Thereafter, a prediction sample of the current block may be derived based on the motion derived information of the current block (S1520). Specifically, L0 prediction samples for the current block may be derived based on the L0 motion information. In addition, L1 prediction samples for the current block may be derived based on the L1 motion information.

Thereafter, a BDOF offset may be derived based on the derived prediction samples (S1530). BDOF of step S1530 may be performed according to the method described in the present disclosure. For example, the BDOF offset may be derived based on gradients (according to the phase) of the L0 prediction samples and gradients (according to the phase) of the L1 prediction samples.

Thereafter, based on the LX (X=0 or 1) prediction samples and the BDOF offset, refined prediction samples of the current block may be derived (S1540). The refined prediction samples may be used to generate a final prediction block of the current block.

The image encoding apparatus may derive residual samples through comparison with original samples based on the prediction samples of the current block generated according to the method of FIG. 15. Information (residual information) on the residual samples may be included and encoded in image/video information and output in the form of a bitstream as described above. In addition, the image decoding apparatus may generate a reconstructed current block based on the prediction samples of the current block generated according to the method of FIG. 15 and the residual samples obtained based on residual information in a bitstream, as described above.

FIG. 16 is a view illustrating input and output of a BDOF process according to an embodiment of the present disclosure.

As shown in FIG. 16, input of the BDOF process may include a width nCbW of a current block, a height CbH), prediction subblocks predSamplesL0 and predSamplesL1 with a boundary area extended by a predetermined length (e.g., 2), prediction direction indices predFlagL0 and predFlagL1 and reference picture indices refIdxL0 and refIdxL1. In addition, input of the BDOF process may further include a BDOF utilization flag bdofUtilizationFlag. In this case, the BDOF utilization flag may be input in units of subblocks within the current block to specify whether BDOF applies to the corresponding subblock.

In addition, the BDOF process may generate a refined prediction block pbSamples by applying BDOF based on the input information.

FIG. 17 is a view illustrating variables used for a BDOF process according to an embodiment of the present disclosure. FIG. 17 may be a process subsequent to FIG. 16.

As shown in FIG. 17, in order to perform the BDOF process, an input bit depth bitDepth of a current block may be set to $BitDepth_Y$. In this case, $BitDepth_Y$ may be derived based on information on a bit depth signaled through a bitstream. In addition, various right shifts may be set based on the bit depth. For example, a first shift shift1, a second shift shift2, a third shift shift3 and a fourth shift shift4 may be derived based on the bit depth as shown in FIG. 17. In addition, an offset offst4 may be set based on shift4. In addition, a variable mvRefineThres for specifying a clipping range of motion refinement may be set based on the bit depth. Usage of various variables described in FIG. 17 will be described below.

FIG. 18 is a view illustrating a method of generating a prediction sample for each subblock in a current CU based on whether to apply BDOF according to an embodiment of the present disclosure. FIG. 18 may be a process subsequent to FIG. 17.

The process shown in FIG. 18 may be performed for each subblock in the current CU and, in this case, the size of the subblock may be 4×4. When a BDOF utilization flag bdofUtilizationFlag for the current subblock is a first value (false, "0"), BDOF may not apply to the current subblock. In this case, the prediction sample of the current subblock is derived by a weighted sum of an L0 prediction sample and an L1 prediction sample, and, in this case, a weight applying to the L0 prediction sample and a weight applying to the L1 prediction sample may be the same. shift4 and offset4 used in Equation (1) of FIG. 18 may be values set in FIG. 17. When a BDOF utilization flag bdofUtilizationFlag for the current subblock is a second value (true, "1"), BDOF may apply to the current subblock. In this case, the prediction sample of the current subblock may be generated by the BDOF process according to the present disclosure.

FIG. 19 is a view illustrating a method of deriving a gradient, auto-correlation and cross-correlation of a current subblock according to an embodiment of the present disclosure. FIG. 19 may be a process subsequent to FIG. 18.

The process shown in FIG. 19 is performed for each subblock in the current CU and, in this case, the size of the subblock may be 4×4.

According to FIG. 19, according to Equation (1) and Equation (2), a position $(h_x, h_y)$ for each sample position (x, y) in the current subblock may be derived. Thereafter, a horizontal gradient and a vertical gradient for each sample position may be derived according to Equation (3) to Equation (6). Thereafter, variables (first intermediate parameter diff and second intermediate parameters tempH and tempV) for deriving auto-correlation and cross-correlation may be derived according to Equation (7) to Equation (9). For example, the first intermediate parameter diff may be derived using a value obtained by applying a right shift to the prediction samples predSamplesL0 and predSamplesL1 of the current block by a second shift shift2. For example, the second intermediate parameters tempH and tempV may be derived by applying a right shift to a sum of a gradient in an L0 direction and a gradient in an L1 direction by a third shift shift3 as in Equation (8) and Equation (9). Thereafter, auto-correlation and cross-correlation may be derived based on the derived first intermediate parameter and second intermediate parameters according to Equation (10) to Equation (16).

FIG. 20 is a view illustrating a method of deriving motion refinement $(v_x, v_y)$, deriving a BDOF offset and generating a prediction sample of a current subblock, according to an embodiment of the present disclosure. FIG. 20 may be a process subsequent to FIG. 19.

The process shown in FIG. 20 is performed for each subblock in the current CU and, in this case, the size of the subblock may be 4×4.

According to Equation 20, motion refinement $(v_x, v_y)$ may be derived according to Equation (1) and Equation (2). Motion refinement may be clipped in a range specified by mvRefineThres. In addition, based on motion refinement and the gradient, a BDOF offset bdofOffset may be derived according to Equation (3). The prediction sample pbSamples of the current subblock may be generated using the derived BDOF offset according to Equation (4).

By continuously performing the methods described with reference to FIGS. 16 to 20, the BDOF process according to the first embodiment of the present disclosure may be implemented. In the embodiment according to FIGS. 16 to 20, the first shift shift1 is set to Max(6, bitDepth-6), and mvRefineThres is set to 1<<Max (, bitDepth-7). Accordingly, bit widths of predSample and each parameter of BDOF according to BitDepth may be derived as shown in the following table.

TABLE 1

| BitDepth | predSample | Shift1 | Gradient | $v_x, v_y$ | bdofOffset |
|---|---|---|---|---|---|
| 8 | 16 [−25022, 24958] | 6 | 11 [−779, 779] | 6 [−32,31] | 17 [−49856, 48298] |
| 10 | 16 | 6 | 11 | 6 | 17 |
| 12 | 16 | 6 | 11 | 6 | 17 |
| 14 | 18 | 8 | 11 | 8 | 19 |
| 16 | 20 | 10 | 11 | 10 | 21 |

In Table 1 above, for example, when BitDepth is 8, predSample has a value of a 16-bit range, the gradient uses 11 bits, $v_x$ and $v_y$ use 6 bits, and, as a result, the range of the bdofOffset value is [−49856, 48298]. As shown in Table 1 above, as BitDepth is changed, the bit width of predSample is changed. However, a gradient having high association with BitDepth has a fixed bit width (11 bits) even when BitDepth is changed. In addition, the bit widths of $v_x$ and $v_y$ which are not associated with BitDepth are changed as BitDepth is changed.

According to the other embodiments of the present disclosure, by refining normalization and clipping of parameters used in the BDOF process, association with the parameters and BitDepth may be more accurately reflected. Accordingly, the parameters may have more accurate values and memory overflow issues in the BDOF process may be solved.

Other embodiments of the present disclosure may be implemented by changing portions of the first embodiment of the present disclosure described above with reference to FIGS. 16 to 20.

Hereinafter, a BDOF process according to a second embodiment of the present disclosure will be described.

The second embodiment of the present disclosure applies a normalization method different from the BDOF process of the first embodiment of the present disclosure. According to the present disclosure, gradients gradientHLX and gradientVLX (in this case, X is 0 or 1) represent the slopes at a 2-pixel distance in the horizontal and vertical direction of the current sample position. In addition, when $v_x$ and $v_y$ are 1/32-pel precision and has a range of values of [−32, 31] or [−32, 32], a value of 1 of $v_x$ and $v_y$ represents an actual 1/32-pel distance. Accordingly, $v_x$ and $v_y$ may be seen as applying "1<<5" operation to a 1-pixel unit value.

According to the second embodiment of the present disclosure, parameters (the horizontal gradient, the vertical gradient, $v_x$ and $v_y$) used to calculate the BDOF offset may be normalized to a 1-pixel unit value. For example, for a gradient which is a slope at a 2-pixel distance, normalization may be performed to a 1-pixel unit value by applying ">>1" operation. In addition, for $v_x$ and $v_y$ of 1/32-pel precision, normalization may be performed to a 1-pixel unit value by applying ">>5" operation. In consideration of this, as shown in Equation (3) of FIG. 23, for normalization, the value obtained by multiplying the gradient by $v_x$ and $v_y$ may be right-shifted by the first shift shift1. In this case, shift1 may be set to a fixed value (e.g., 7) regardless of the bit depth. In addition, $v_x$ and $v_y$ may be clipped in a range of a value set regardless of the bit depth. For example, a variable mvRefineThres specifying the clipping range of $v_x$ and $v_y$ may be set to a value of "1<<5". As described above, normalization according to the second embodiment of the present disclosure may be performed by considering the gradient and $v_x$ and $v_y$.

The second embodiment of the present disclosure may be implemented by improving FIGS. 17, 19 and 20 of the first embodiment of the present disclosure.

FIG. 21 is a view illustrating variables used for a BDOF process according to another embodiment of the present disclosure. FIG. 21 may be an example obtained by modifying the example of FIG. 17. Accordingly, a description of common portions in FIGS. 17 and 21 will be omitted.

As shown in FIG. 21, in order to perform a BDOF process, an input bit depth bitDepth of a current block may be set to BitDepth$_Y$. In this case, BitDepth$_Y$ may be derived based on information on a bit depth signaled through a bitstream. In addition, a first shift shift1, a second shift shift2 and a third shift shift3 may be set to a fixed value regardless of the bit depth. For example, the first shift shift1, the second shift shift2 and the third shift shift3 may be set to 7, 4 and 1, respectively. The fourth shift shift4 and offset offset4 may be derived in the same manner as the example of FIG. 17. In addition, a variable mvRefineThres may be set to a fixed value regardless of the bit depth. For example, the variable mvRefineThres may be set to "1<<5".

FIG. 22 is a view illustrating a method of deriving a gradient, auto-correlation and cross-correlation of a current subblock according to another embodiment of the present disclosure. FIG. 22 may be an example obtained by modifying the example of FIG. 19. Accordingly, a description of common portions in FIGS. 19 and 22 will be omitted.

Compared to the example of FIG. 19, in the gradient calculation of Equation (3) to Equation (6) of FIG. 22, right shift operation (">>shift1") may not be performed. According to the present embodiment, it is possible to obtain a gradient with higher accuracy by omitting the right shift operation.

FIG. 23 is a view illustrating a method of deriving motion refinement ($v_x$, $v_y$), deriving a BDOF offset and generating a prediction sample of a current subblock, according to another embodiment of the present disclosure. FIG. 23 may be an example obtained by modifying the example of FIG. 20. Accordingly, a description of common portions in FIGS. 20 and 23 will be omitted.

Compared to the example of FIG. 20, in calculation of bdofOffset of Equation (3) of FIG. 23, right shift operation ">>1" may be changed to ">>shift1". That is, as described above, for normalization of the gradient and $v_x$ and $v_y$, a value obtained by multiplying the gradient by $v_x$ and $v_y$ may be right-shifted by the first shift shift1. In this case, shift1 may be set to a fixed value (e.g., 7) regardless of the bit depth, as described above.

As described above, by modifying the examples of FIGS. 17, 19 and 20 according to the first embodiment of the present disclosure as shown in FIGS. 21, 22 and 23, the second embodiment of the present disclosure may be implemented.

According to the second embodiment of the present disclosure, bit widths of predSample and each parameter of BDOF according to BitDepth may be derived as shown in the following table.

TABLE 2

| BitDepth | predSample | Shift1 | Gradient | $v_x$, $v_y$ | bdofOffset |
|---|---|---|---|---|---|
| 8 | 16 [−25022, 24958] | 7 | 17 [−49980, 49980] | 6 [−32, 31] | 17 [−49980, 49980] |
| 10 | 16 | 7 | 17 | 6 | 17 |
| 12 | 16 | 7 | 17 | 6 | 17 |
| 14 | 18 | 7 | 19 | 6 | 19 |
| 16 | 20 | 7 | 21 | 6 | 21 |

As shown in Table 2 above, the gradient having high association with the bit depth is changed according to the bit depth. In addition, since the range of the gradient value is determined based on the predSample value, accuracy of the gradient value may increase. In addition, the bit widths of $v_x$ and $v_y$ which are not associated with the bit depth may have a fixed value regardless of the bit depth. According to Table 2, instead of increasing the range of the gradient value, since the range of the values of $v_x$ and $v_y$ decreases, it may not affect the range of the bdofOffset value.

Hereinafter, a BDOF process according to a third embodiment of the present disclosure will be described.

As described above in the second embodiment of the present disclosure, the gradient and $v_x$ and $v_y$ may be normalized to a 1-pixel unit value. However, according to the embodiment of FIG. 22, bit overflow may be generated in the gradient calculation process. For example, as shown in Equation (3) to Equation (6) of FIG. 22, when shift operation is not performed in the gradient calculation process, 32-bit operation may be performed to calculate the gradient. That is, bit overflow may be generated when calculating the gradient.

In the third embodiment of the present disclosure, in consideration of this, normalization for the gradient is applicable when calculating the gradient. That is, normalization may be performed by applying ">>1" operation when calculating the gradient, thereby preventing bit overflow. According to the third embodiment of the present disclosure, the gradient may not exceed 16 bits. Meanwhile, normalization for $v_x$ and $v_y$ may be performed by applying right shift operation by the adjusted shift1. For example, shift1 may be set to a fixed value (e.g., 6) regardless of the bit depth.

A third embodiment of the present disclosure may be implemented by improving FIGS. 21 and 22 of the second embodiment of the present disclosure.

FIG. 24 is a view illustrating variables used for a BDOF process according to another embodiment of the present disclosure. FIG. 24 may be an example obtained by modifying the example of FIG. 21. Accordingly, a description of common portions in FIGS. 21 and 24 will be omitted.

As shown in FIG. 24, in order to perform a BDOF process, an input bit depth bitDepth of a current block may be set to BitDepth$_Y$. In this case, BitDepth$_Y$ may be derived based on information on a bit depth signaled through a bitstream. In addition, a first shift shift1, a second shift shift2 and a third shift shift3 may be set to a fixed value regardless of the bit depth. For example, the first shift shift1, the second shift shift2 and the third shift shift3 may be set to 6, 4 and 1, respectively. The fourth shift shift4 and offset offset4 may be derived in the same manner as the example of FIG. 17. In addition, a variable mvRefineThres may be set to a fixed value regardless of the bit depth. For example, the variable mvRefineThres may be set to "1<<5".

FIG. 25 is a view illustrating a method of deriving a gradient, auto-correlation and cross-correlation of a current subblock according to another embodiment of the present disclosure. FIG. 25 may be an example obtained by modifying the example of FIG. 22. Accordingly, a description of common portions in FIGS. 22 and 25 will be omitted.

Compared to the example of FIG. 22, in the gradient calculation of Equation (3) to Equation (6) of FIG. 25, right shift operation (">>1") may be performed. By performing right shift operation in the gradient calculation process, it is possible to prevent bit overflow from being generated.

In addition, as shown in FIG. 24, since shift1 is modified to 6, the total right shift applying to the gradient and $v_x$ and $v_y$ is "7". Accordingly, the total right shift in the third embodiment of the present disclosure and the second embodiment of the present disclosure may be equally maintained.

As described above, by modifying the examples of FIGS. 21 and 22 according to the second embodiment of the present disclosure as shown in FIGS. 24 and 25, the third embodiment of the present disclosure may be implemented.

According to the third embodiment of the present disclosure, bit widths of predSample and each parameter of BDOF according to BitDepth may be derived as shown in the following table.

TABLE 3

| BitDepth | predSample | Shift1 | Gradient | $v_x$, $v_y$ | bdofOffset |
|---|---|---|---|---|---|
| 8 | 16 [−25022, 24958] | 6 | 16 [−24990, 24990] | 6 [−32, 31] | 17 [−49980, 49980] |
| 10 | 16 | 6 | 16 | 6 | 17 |
| 12 | 16 | 6 | 16 | 6 | 17 |
| 14 | 18 | 6 | 18 | 6 | 19 |
| 16 | 20 | 6 | 20 | 6 | 21 |

As shown in Table 3 above, the gradient having high association with the bit depth is changed according to the bit depth. In addition, since the range of the gradient value is determined based on the predSample value, accuracy of the gradient value may increase. In addition, by performing right-shifting operation in Equation (3) to Equation (6) of FIG. 25, bit overflow when calculating the gradient may be prevented. In addition, the bit widths of $v_x$ and $v_y$ which are not associated with the bit depth may have a fixed value regardless of the bit depth.

Hereinafter, a BDOF process according to a fourth embodiment of the present disclosure will be described.

As described above in the second embodiment of the present disclosure, the gradient and $v_x$ and $v_y$ may be normalized to a 1-pixel unit value. However, according to the embodiment of FIG. 22, bit overflow may be generated in the gradient calculation process. For example, as shown in Equation (3) to Equation (6) of FIG. 22, when shift operation is not performed in the gradient calculation process, 32-bit operation may be performed to calculate the gradient. That is, bit overflow may be generated when calculating the gradient.

In the fourth embodiment of the present disclosure, in consideration of this, by performing clipping when calculating the gradient, bit overflow may be prevented. According to the fourth embodiment of the present disclosure, the gradient may not exceed 16 bits. Meanwhile, normalization for the gradient and $v_x$ and $v_y$ may be performed in the same manner as the second embodiment of the present disclosure. To this end, a value obtained by multiplying the gradient by $v_x$ and $v_y$ may be right-shifted by the first shift shift1. For example, shift1 may be set to a fixed value (e.g., 7) regardless of the bit depth.

A fourth embodiment of the present disclosure may be implemented by improving FIGS. 21 and 22 of the second embodiment of the present disclosure.

FIG. 26 is a view illustrating variables used for a BDOF process according to another embodiment of the present disclosure. FIG. 26 may be an example obtained by modifying the example of FIG. 21. Accordingly, a description of common portions in FIGS. 21 and 26 will be omitted.

As shown in FIG. 26, in order to perform a BDOF process, an input bit depth bitDepth of a current block may be set to BitDepth$_Y$. In this case, BitDepth$_Y$ may be derived based on information on a bit depth signaled through a bitstream. In addition, a first shift shift1, a second shift shift2 and a third shift shift3 may be set to a fixed value regardless of the bit depth. For example, the first shift shift1, the second shift shift2 and the third shift shift3 may be set to 7, 4 and 1, respectively. The fourth shift shift4 and offset offset4 may be derived in the same manner as the example of FIG. 17. In addition, a variable mvRefineThres may be set to a fixed value regardless of the bit depth. For example, the variable mvRefineThres may be set to "1<<5". In addition, a variable gradLimit for specifying a clipping range of a gradient value may be set. In this case, gradLimit may be set based on the bit depth, and may be, for example, set to "1<<Max (15, BitDepth+3)".

FIG. 27 is a view illustrating a method of deriving a gradient, auto-correlation and cross-correlation of a current subblock according to another embodiment of the present disclosure. FIG. 27 may be an example obtained by modifying the example of FIG. 22. Accordingly, a description of common portions in FIGS. 22 and 27 will be omitted.

Compared to the example of FIG. 22, in the gradient calculation of Equation (3) to Equation (6) of FIG. 27, clipping operation may be performed. That is, the calculated gradient value may be clipped to a value in a range specified by gradLimit. For example, the range of clipping may be [−gradLimit, gradLimit−1]. According to the third embodiment, by performing clipping operation in the gradient calculation process, it is possible to prevent bit overflow from being generated.

As described above, by modifying the examples of FIGS. 21 and 22 according to the second embodiment of the present disclosure as shown in FIGS. 26 and 27, the fourth embodiment of the present disclosure may be implemented.

According to the fourth embodiment of the present disclosure, bit widths of predSample and each parameter of BDOF according to BitDepth may be derived as shown in the following table.

TABLE 4

| BitDepth | predSample | Shift1 | Gradient | $v_x$, $v_y$ | bdofOffset |
|---|---|---|---|---|---|
| 8 | 16 | 7 | 16 | 6 | 17 |
|  | [−25022, 24958] |  | [−24990, 24990] | [−32, 31] | [−49980, 49980] |
| 10 | 16 | 7 | 16 | 6 | 17 |
| 12 | 16 | 7 | 16 | 6 | 17 |
| 14 | 18 | 7 | 18 | 6 | 19 |
| 16 | 20 | 7 | 20 | 6 | 21 |

As shown in Table 4 above, the gradient having high association with the bit depth is changed according to the bit depth. In addition, since the range of the gradient value is determined based on the predSample value, accuracy of the gradient value may increase. In addition, by performing clipping operation in Equation (3) to Equation (6) of FIG. 27, bit overflow when calculating the gradient may be prevented. In addition, the bit widths of $v_x$ and $v_y$ which are not associated with the bit depth may have a fixed value regardless of the bit depth.

Hereinafter, an embodiment of clipping a BDOF offset according to the present disclosure will be described.

A prediction sample predSample generated by interpolation of inter prediction has a range of values determined by an input bit depth and a coefficient of an interpolation filter, and, in the worst case, has a range of values of [−16830, 33150]. In this case, by adding a value of −8192 to the predSample value in order to prevent 16-bit overflow, as shown in Table 1, the value of predSample may be adjusted to the range of [−25022, 24958].

Accordingly, as shown in Table 1, when BitDepth$_Y$ is 8, predSample has a value of a 16-bit range, the gradient uses 11 bits, $v_x$ and $v_y$ use 6 bits, and eventually the range of bdofOffset is [−49856, 48298]. Accordingly, according to various embodiments of the present disclosure, when predSample and bdofOffset are added, 16-bit overflow may be generated.

According to the present disclosure, when the value of the refined prediction sample is calculated by clipping the BDOF offset (bdofOffset) value in a predetermined range, 16-bit overflow may be prevented from being generated. More specifically, predSample has a value of a 16-bit range when the bit depth is 8 to 12 and predSample has a value of an 18-bit range and 20-bit range when the bit depth is 14 and 16, respectively. Accordingly, the clipping range of bdofOffset may also be defined in consideration of the bit depth. For example, a variable OffsetLimit specifying the clipping range of bdofOffset may be defined based on the bit depth, and clipping of bdofOffset may additionally apply to the embodiments of the present disclosure.

For example, in Equation (4) of FIG. 20 and Equation (4) of FIG. 23, bdofOffset may be clipped in a range of [−OffsetLimit, OffsetLimit−1]. For example, in Equation (4) of FIG. 20 and Equation (4) of FIG. 23, bdofOffset may be replaced with Clip3 (−OffsetLimit, OffsetLimit−1, bdofOffset). In this case, OffsetLimit may be defined based on the bit depth. For example, OffsetLimit may be set to "1<<Max (12, BitDepth$_Y$)". As described above, by applying clipping to bdofOffset, bit overflow which may be generated when adding predSample and bdofOffset may be prevented.

Hereinafter, a method of deriving a BDOF offset bdofOffset according to another embodiment of the present disclosure will be described.

According to the present embodiment, it is possible to minimize right shift operation in the gradient calculation process to improve accuracy of the BDOF offset. In addition, when performing right shift operation in the bdofOffset calculation process, by adding the offset value, accuracy of bdofOffset may further increase. In this case, the offset may be determined based on the right shift. For example, the present embodiment may apply to the third embodiment of the present disclosure. In this case, Equation (3) of FIG. 23 may be modified as follows.

bdofOffset=($v_x$*(gradientHL0[$x$+1][$y$+1]−gradientHL1[$x$+1][$y$+1]+offset))>>shift1+($v_y$*(gradientVL0[$x$+1][$y$+1]−gradientVL1[$x$+1][$y$+1])+offset)>>shift1

In the above equation, shift1 may be set to "6", and the offset may be set based on shift1 such as "1<< (shift1-1)".

Modification of Equation (3) above is not limited to application to the third embodiment of the present disclosure and is applicable to other embodiments of the present disclosure. For example, modification of Equation (3) may apply to a fourth embodiment of the present disclosure. In this case, shift1 may be set to "7" and the offset may be set based on shift1 such as "1<< (shift1-1)".

According to the present embodiment, by minimizing right shift operation in the gradient calculation process and adding an offset value when performing right shift operation in the bdofOffset calculation process, it is possible to increase accuracy of bdofOffset.

Hereinafter, a method of deriving a BDOF offset bdofOffset according to another embodiment of the present disclosure will be described.

As described above, in a BDOF offset calculation process, various variables are derived using a prediction sample and a gradient. When normalization is performed according to various embodiments of the present disclosure, if the right shift is set to "1" or clipping is performed in the gradient calculation process, the bit range of the gradient value may vary. For example, as shown in Table 1, in the first embodiment of the present disclosure, a gradient in a 11-bit range may be calculated by applying ">>6" to a prediction sample in a 16-bit range. In this case, according to the third embodiment or fourth embodiment of the present disclosure, when ">>1" or clipping applies to the prediction sample in the 16-bit range, as shown in Table 3 or 4, the gradient may have a value in the 16-bit range. However, when the range of the gradient value increases, 16-bit overflow may be generated when calculating variables tempH and tempV calculated based on the gradient. In the present embodiment, in consideration of this, bit overflow may be prevented from being generated by applying right shift operation to each item of the gradient when calculating tempH and tempV. For example, Equation (8) and Equation (9) of FIGS. 25 and 27 may be modified as follows.

$$\text{tempH}[x][y]=(\text{gradientHL0}[x][y]\text{>>shift3})+(\text{gradientHL0}[x][y]\text{>>shift3}) \quad (8)$$

$$\text{tempV}[x][y]=(\text{gradientVL0}[x][y]\text{>>shift3})+(\text{gradientVL1}[x][y]\text{>>shift3}) \quad (9)$$

In the modified Equations (8) and (9), shift3 may be set to Max(1, bitDepth−11) or a fixed value of 1. As described above, by modifying the third and fourth embodiments of the present disclosure, bit overflow may be prevented from being generated when calculating tempH and tempV.

Hereinafter, a method of preventing bit overflow from being generated according to another embodiment of the present disclosure will be described.

As described above, when ">>1" or clipping applies to a prediction sample in a 16-bit range according to the third or fourth embodiment of the present disclosure, 16-bit overflow may be generated when calculating the variables tempH and tempV. In this case, even in calculation of intermediate parameters such as sGx2, sGy2, sGxGy, sGxdI and sGydI calculated based on the variables tempH and tempV, 16-bit overflow may be generated. According to the present embodiment, in order to prevent generation of bit overflow in calculation not only of the variables tempH and tempV but also of the intermediate parameters sGx2, sGy2, sGxGy, sGxdI and sGydI, right shift shift3 applying to the modified equations (8) and (9) may be adjusted. For example, in the third embodiment of the present disclosure, in modification of Equations (8) and (9) of FIG. 25 as described above, shift3 may be set to Max (6, bitDepth−6) or a fixed value of 6. In addition, in the fourth embodiment of the present disclosure, in modification of Equations (8) and (9) of FIG. 27 as described above, shift3 may be set to Max (6, bitDepth−6)+1 or a fixed value of 7. According to the present embodiment, in calculation not only of the variables tempH and tempV but also of the intermediate parameters sGx2, sGy2, sGxGy, sGxdI and sGydI, bit overflow may be prevented from being generated.

The embodiments of the present disclosure are not limited to the above-described examples, and the embodiments of the present disclosure may be used in combination with other embodiments or modifications. For example, a fifth embodiment of the present disclosure may be implemented by changing the step of FIG. 17 among steps of the first embodiment of the present disclosure described with reference to FIGS. 16 to 20. For example, by changing FIG. 17 of the first embodiment of the present disclosure to FIG. 24 of the third embodiment of the present disclosure, the fifth embodiment of the present disclosure may be derived.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 28:
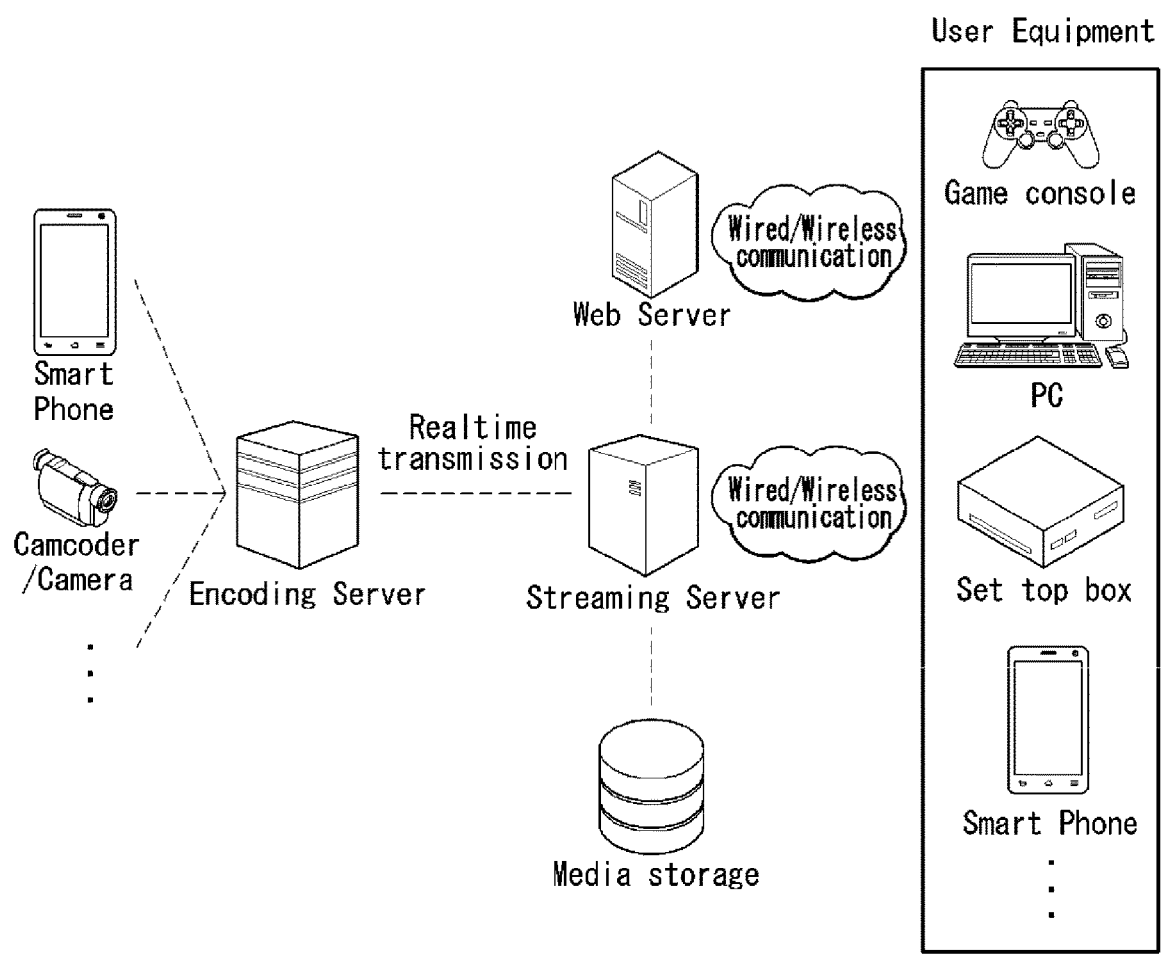
FIG. 28 is a view showing a content streaming system, to which an embodiment of the present disclosure is applicable.

FIG. 28 is a view showing a content streaming system, to which an embodiment of the present disclosure is applicable.

As shown in FIG. 28, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:
1. An image decoding method performed by an image decoding apparatus, the image decoding method comprising:
deriving a L0 prediction sample and a L1 prediction sample of a current block by using motion information of the current block;
deriving a gradient for a predetermined area including a current subblock in the current block;
deriving motion offset (vx, vy) for the current subblock by using the gradient;
deriving a Bi-directional Optical Flow (BDOF) offset by using the gradient and the motion offset; and
deriving a prediction sample for the current block by using the L0 prediction sample, the L1 prediction sample of the current block and the BDOF offset,
wherein the gradient is derived by right-shifting the L0 prediction sample and the L1 prediction sample of the current block by a first shift,
wherein the deriving the motion offset (vx, vy) comprises:
deriving a first intermediate parameter diff by subtracting the L1 prediction sample of the current block from the L0 prediction sample of the current block; and
deriving second intermediate parameters tempH and tempV by right-shifting the gradient by a third shift,
wherein the deriving the first intermediate parameter diff comprises right-shifting the L0 prediction sample and the L1 prediction sample of the current block by a second shift,
wherein the first shift, the second shift and the third shift are set to a fixed value regardless of a bit depth of the current block,
wherein a value of the first shift is different from a value of the second shift and a value of the third shift, and
wherein a value of the second shift is different from a value of the third shift.
2. The image decoding method of claim 1, wherein the first shift is 6.
3. The image decoding method of claim 1, wherein the second shift is 4.
4. The image decoding method of claim 1, wherein the third shift is 1.
5. The image decoding method of claim 1, wherein the motion offset (vx, vy) is clipped in a predetermined range.
6. The image decoding method of claim 5, wherein the predetermined range in which the motion offset (vx, vy) is clipped is set to a fixed range regardless of a bit depth of the current block.
7. The image decoding method of claim 1,
wherein the deriving the BDOF offset comprises right-shifting, by a predetermined shift, a value derived by using the gradient and the motion offset, and
wherein the predetermined shift is set to a fixed range regardless of a bit depth of the current block.

8. The image decoding method of claim 1,
wherein the deriving the prediction sample for the current block comprises clipping the BDOF offset in a predetermined range, and
wherein the predetermined range is set based on a bit depth of the current block.
9. An image decoding apparatus comprising:
a memory; and
at least one processor,
wherein the at least one processor is configured to:
derive a L0 prediction sample and a L1 prediction sample of a current block by using motion information of the current block;
derive a gradient for a predetermined area including a current subblock in the current block;
derive motion offset (vx, vy) for the current subblock by using the gradient;
derive a Bi-directional Optical Flow (BDOF) offset by using the gradient and the motion offset; and
derive a prediction sample for the current block by using the L0 prediction sample, the L1 prediction sample of the current block and the BDOF offset,
wherein the gradient is derived by right-shifting the L0 prediction sample and the L1 prediction sample of the current block by a first shift,
wherein the deriving the motion offset (vx, vy) comprises:
deriving a first intermediate parameter diff by subtracting the L1 prediction sample of the current block from the L0 prediction sample of the current block; and
deriving second intermediate parameters tempH and tempV by right-shifting the gradient by a third shift,
wherein the deriving the first intermediate parameter diff comprises right-shifting the L0 prediction sample and the L1 prediction sample of the current block by a second shift,
wherein the first shift, the second shift and the third shift are set to a fixed value regardless of a bit depth of the current block,
wherein a value of the first shift is different from a value of the second shift and a value of the third shift, and
wherein a value of the second shift is different from a value of the third shift.
10. An image encoding method performed by an image encoding apparatus, the image encoding method comprising:
deriving a L0 prediction sample and a L1 prediction sample of a current block by using motion information of the current block;
deriving a gradient for a predetermined area including a current subblock in the current block;
deriving motion offset (vx, vy) for the current subblock by using the gradient;
deriving a Bi-directional Optical Flow (BDOF) offset by using the gradient and the motion offset; and
deriving a prediction sample for the current block by using the L0 prediction sample, the L1 prediction sample of the current block and the BDOF offset,
wherein the gradient is derived by right-shifting the L0 prediction sample and the L1 prediction sample of the current block by a first shift,
wherein the deriving the motion offset (vx, vy) comprises:
deriving a first intermediate parameter diff by subtracting the L1 prediction sample of the current block from the L0 prediction sample of the current block; and deriving second intermediate parameters tempH and tempV by right-shifting the gradient by a third shift, wherein the deriving the first intermediate parameter diff comprises right-shifting the L0 prediction sample and the L1 prediction sample of the current block by a second shift, wherein the first shift, the second shift and the third shift are set to a fixed value regardless of a bit depth of the current block, wherein a value of the first shift is different from a value of the second shift and a value of the third shift, and wherein a value of the second shift is different from a value of the third shift.

11. A method of transmitting a bitstream comprising:

transmitting a bitstream generated by an image encoding method, wherein the image encoding method comprises, deriving a L0 prediction sample and a L1 prediction sample of a current block by using motion information of the current block;

deriving a gradient for a predetermined area including a current subblock in the current block;

deriving motion offset (vx, vy) for the current subblock by using the gradient;

deriving a Bi-directional Optical Flow (BDOF) offset by using the gradient and the motion offset; and deriving a prediction sample for the current block by using the L0 prediction sample, the L1 prediction sample of the current block and the BDOF offset, wherein the gradient is derived by right-shifting the L0 prediction sample and the L1 prediction sample of the current block by a first shift, wherein the deriving the motion offset (vx, vy) comprises:

deriving a first intermediate parameter diff by subtracting the L1 prediction sample of the current block from the L0 prediction sample of the current block; and deriving second intermediate parameters tempH and tempV by right-shifting the gradient by a third shift, wherein the deriving the first intermediate parameter diff comprises right-shifting the L0 prediction sample and the L1 prediction sample of the current block by a second shift, wherein the first shift, the second shift and the third shift are set to a fixed value regardless of a bit depth of the current block, wherein a value of the first shift is different from a value of the second shift and a value of the third shift, and wherein a value of the second shift is different from a value of the third shift.

* * * * *